US007813566B2

(12) United States Patent
Sekiguchi et al.

(10) Patent No.: US 7,813,566 B2
(45) Date of Patent: Oct. 12, 2010

(54) DATA PROCESSING APPARATUS AND DATA PROCESSING METHOD

(75) Inventors: Tomohiro Sekiguchi, Tokyo (JP); Naoki Kumazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 11/735,564

(22) Filed: Apr. 16, 2007

(65) Prior Publication Data

US 2008/0037903 A1 Feb. 14, 2008

(30) Foreign Application Priority Data

May 24, 2006 (JP) .............................. 2006-143752

(51) Int. Cl.
*G06K 9/36* (2006.01)
(52) U.S. Cl. ..................... 382/232; 382/100; 382/300
(58) Field of Classification Search .................. 382/100, 382/232, 300
See application file for complete search history.

(56) References Cited

U.S. PATENT DOCUMENTS

| 4,675,733 | A | * | 6/1987 | Tanimoto | ............... | 375/240.08 |
| 5,245,679 | A | | 9/1993 | Rosenberg | | |
| 5,457,499 | A | * | 10/1995 | Lim | ............................ | 348/474 |
| 6,673,017 | B1 | * | 1/2004 | Jackson | ....................... | 600/437 |
| 6,782,133 | B2 | * | 8/2004 | Yokose et al. | ................ | 382/232 |
| 6,947,096 | B2 | * | 9/2005 | Kumazawa | .................. | 348/488 |
| 7,221,706 | B2 | * | 5/2007 | Zhao et al. | ............. | 375/240.08 |
| 7,242,852 | B2 | * | 7/2007 | Sawada | ......................... | 386/111 |
| 2005/0286804 | A1 | * | 12/2005 | Hong | .......................... | 382/300 |

FOREIGN PATENT DOCUMENTS

JP 6-90358 3/1994

* cited by examiner

*Primary Examiner*—Tom Y Lu
(74) *Attorney, Agent, or Firm*—Oblon, Spivak, McClelland, Maier & Neustadt, L.L.P.

(57) ABSTRACT

A data processing apparatus includes: a data input section for receiving input of a plurality discrete data arranged at predetermined time intervals; a first-derivative adding section for adding a first derivative to each input discrete data; using a plurality of the discrete data with the additional first derivative, when a difference between one or a plurality of discrete data interposed between two discrete data and a value on a curve passing through the two discrete data points generated on the basis of the two discrete data, the first derivative, and time interval information of the two discrete data is within an allowable error, a homogeneity/heterogeneity conversion section for obtaining a plurality of discrete data having heterogeneous time intervals and the additional first derivative by thinning one or a plurality of the discrete data interposed between the two discrete data; and a heterogeneous-data generation section for generating the heterogeneous data.

8 Claims, 19 Drawing Sheets

(a) Y(j−1) CAN BE INTERPOLATED WITHIN ALLOWABLE ERROR (b) Y(j−1) AND Y(j−2) CAN HARDLY BE INTERPOLATED WITHIN ALLOWABLE ERROR (c) Y(j−1) CAN BE INTERPOLATED WITHIN ALLOWABLE ERROR

THE SAME THING IS REPEATED IN THE FOLLOWING

DATA PROCESSING APPARATUS AND DATA PROCESSING METHOD

CROSS REFERENCES TO RELATED APPLICATIONS

The present invention contains subject matter related to Japanese Patent Application JP 2006-143752 filed in the Japanese Patent Office on May 24, 2006, the entire contents of which are incorporated herein by reference.

BACKGROUND OF THE INVENTION

1. Field of the Invention

The present invention relates to a data processing apparatus and method for processing discrete data arranged at predetermined time intervals.

Specifically, this invention relates to a data processing apparatus, etc., capable of redefining resolution and reproducing data to a necessary band. In this invention, the data processing apparatus individually adds a first derivative to a plurality of N-bit discrete data arranged at first time intervals. When one or a plurality of discrete data interposed between two discrete data can be approximated by a curve which passes through the two discrete data and is generated on the basis of the discrete data, the first derivative, and the time interval information, the data processing apparatus deletes one or a plurality of the discrete data, and generates a plurality of discrete data having heterogeneous time intervals, the additional first derivative and the time interval information. After that, the data processing apparatus generates a curve passing through the two discrete data generated on the basis of the two consecutive discrete data, the discrete data, a first derivative, and time interval information using a plurality of the discrete data, and obtains a plurality of M-bit discrete data arranged at second time intervals on the basis of each curve.

2. Description of the Related Art

The bandwidth of discrete data can be improved by increasing the sampling frequency of the discrete data. However, if the signal components using the band defined there are really few, similar signals are sampled many times, and thus there has been a problem in that it is inefficient for storing the data into a medium, such as a memory, etc., for example.

Also, when an attempted is made to output data with higher resolution than input data, for example it is necessary to pass the data through a band-limitation filter, etc. In order to obtain a smooth characteristic, it becomes necessary to impose a strong band limitation. Thus, there has been a problem in that the high-frequency components originally held by the data are dropped.

For example, Japanese Unexamined Patent Application Publication No. 06-90358 has disclosed a data compression method in which one or a plurality of discrete data interposed between two discrete data (data sample) can be approximated by an approximate line (straight line), and one or a plurality of the discrete data is removed in order to compress the data.

SUMMARY OF THE INVENTION

In the data compression method described in the Japanese Unexamined Patent Application Publication No. 06-90358, data compression is performed by removing discrete data using an approximate line (straight line), and, at the time of decompression, the discrete data is interpolated using the same approximate line (straight line) as that of the compression time. That is to say, in the patent document described above, there is no description on the fact that it becomes possible to redefine resolution and to reproduce the data to a necessary band by making it possible to interpolate the discrete data interposed between the remaining discrete data by a smooth curve.

It is desirable to make it possible to redefine resolution and to reproduce data to have a necessary band.

According to an embodiment of the present invention, there is provided a data processing apparatus including: a data input section for receiving input of a plurality of N-bit (N is a positive integer) discrete data arranged at first time intervals; a first-derivative adding section for adding a first derivative to each discrete data input in the data input section; using a plurality of the discrete data with the additional first derivative obtained by the first-derivative adding section, when a difference between one or a plurality of discrete data interposed between two discrete data and a value on a curve passing through the two discrete data generated on the basis of the two discrete data, the first derivative added to the two discrete data, and time interval information of the two discrete data is within an allowable error, a homogeneity/heterogeneity conversion section for obtaining a plurality of discrete data having heterogeneous time intervals and the additional first derivative by thinning one or a plurality of the discrete data interposed between the two discrete data; a heterogeneous-data generation section for generating heterogeneous data by adding time interval information to a plurality of the discrete data having the additional first derivative obtained by the homogeneity/heterogeneity conversion section; using the heterogeneous data generated by the homogeneity/heterogeneity conversion section, a curve generation section for generating a curve passing through two positions of each two consecutive discrete data among the heterogeneous data on the basis of the two consecutive discrete data, a first derivative added to the two consecutive discrete data, and time interval information of the two consecutive discrete data; and a data reproducing section for generating and outputting a plurality of M-bit (M is a positive integer, and is the same as or different from N) discrete data arranged at second time intervals, being the same as or different from the first time intervals, on the basis of each curve generated by the curve generation section.

In this invention, a plurality of N-bit (N is a positive integer) discrete data arranged at first time intervals are input, and a first derivative is added to each discrete data.

For example, assuming that discrete data to which a first derivative is added is target discrete data, a first derivative is generated using a difference between the target discrete data and discrete data located before and after the target discrete data. In this case, if a difference between the adjacent discrete data and the target discrete data is greater than a predetermined value, the adjacent discrete data is used as discrete data located before and after the target discrete data. If the difference is within the predetermined value, the adjacent data and all the consecutive discrete data having a difference with the target discrete data not greater than the predetermined value are used. In this manner, when the level value of the data is close to that of the discrete data adjacent to target discrete data, it becomes possible to obtain a first derivative which is close to the original continuous waveform by viewing data in a wide range.

As described above, a plurality of discrete data having heterogeneous time intervals and each additional first derivative are obtained from a plurality of discrete data with additional first derivative. In this case, a curve passing through the two discrete data positions is generated on the basis of one or a plurality of discrete data interposed between two discrete data, the two discrete data, the first derivative added to the discrete data, and the time interval information of the two discrete data. When the difference with a value on this curve is within an allowable error, one or a plurality of the discrete data interposed between the two discrete data is thinned.

In this regard, when the discrete data having heterogeneous time intervals is generated from a plurality of discrete data having homogeneous time intervals, the fluctuations of lower one bit of a plurality of the discrete data having homogeneous time intervals may be suppressed in advance. Thus, it becomes possible to prevent producing a curve different from the one generated using original right values, and to stably obtain a plurality of discrete data having heterogeneous time intervals.

In this manner, the time interval information is added to a plurality of discrete data having heterogeneous time intervals and additional first derivatives to generate the heterogeneous data. A curve for obtaining interpolation data is generated for each two discrete data using this heterogeneous data. In this case, it is possible to temporarily store the data into a storage section, and to use the heterogeneous data read out at a predetermined timing. Here, a curve passing through the two discrete data positions is generated for each two consecutive data on the basis of the two discrete data, a first derivative added to the two discrete data, and time interval information of the two discrete data.

A plurality of M-bit discrete data arranged at second time intervals, which are the same as or different from the first time intervals, are generated on the basis of each curve generated in this manner. In this manner, a curve for obtaining interpolation data is formed for each two discrete data constituting the heterogeneous data, and a plurality of M-bit discrete data arranged at the second time intervals are generated on the basis of this curve. Thus, the resolution can be redefined by the setting of the M value, and it becomes possible to reproduce to the band necessary by the setting of the second time intervals.

By this invention, the data processing apparatus individually adds a first derivative to a plurality of N-bit discrete data arranged at first time intervals. When one or a plurality of discrete data interposed between two discrete data can be approximated by a curve which passes through the two discrete data positions and is generated on the basis of the two discrete data, the first derivative added to the two discrete data, and the time interval information, one or a plurality of the discrete data is thinned, and a plurality of the first discrete data having heterogeneous time intervals, the additional first derivative, and the time interval information is generated. After that, a curve passing through the two discrete data positions is generated for each two consecutive discrete data, on the basis of the discrete data, the first derivative, and the time interval information using a plurality of the discrete data, and a plurality of M-bit discrete data arranged at second time intervals are obtained on the basis of each curve. Thus, it becomes possible to redefine resolution and to reproduce data to a necessary band.

DESCRIPTION OF THE PREFERRED EMBODIMENTS

Figure 1:
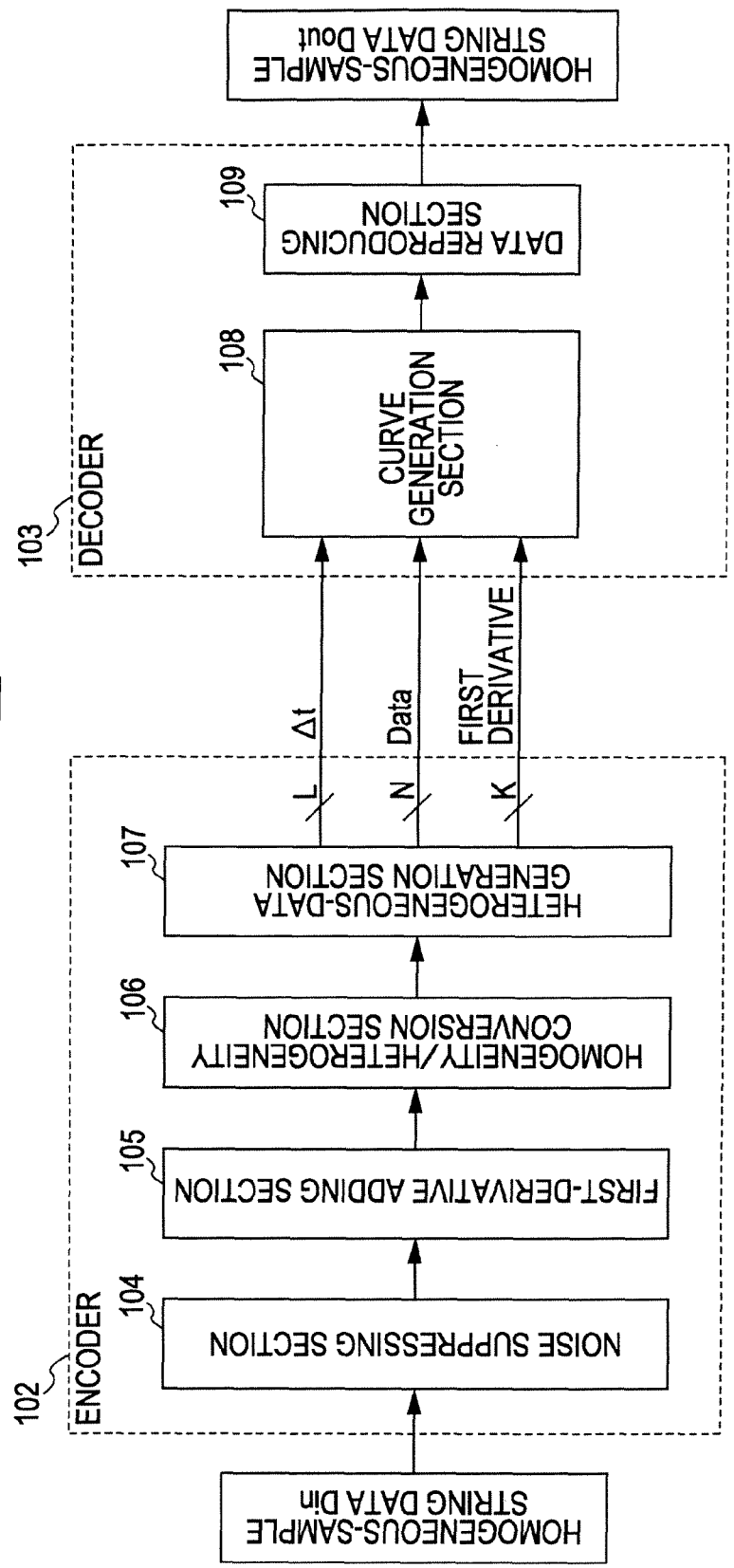
FIG. 1 is a block diagram illustrating the configuration of a data processing apparatus according to an embodiment.

In the following, a description will be given of an embodiment of this invention with reference to the drawings. FIG. 1 illustrates the configuration of a data processing apparatus 100 according to the embodiment. The data processing apparatus 100 includes an encoder 102 and a decoder 103.

First, a description will be given of the encoder 102. This encoder 102 has a noise suppressing section 104, a first-derivative adding section 105, a homogeneity/heterogeneity conversion section 106, and a heterogeneous-data generation section 107. This encoder 102 receives the input of homogeneous-sample sting data Din. The homogeneous-sample sting data Din includes a plurality of N-bit (N is a positive integer) discrete data arranged at time intervals of 1/fs1. Here, fs1 is a sampling frequency.

Figure 2:
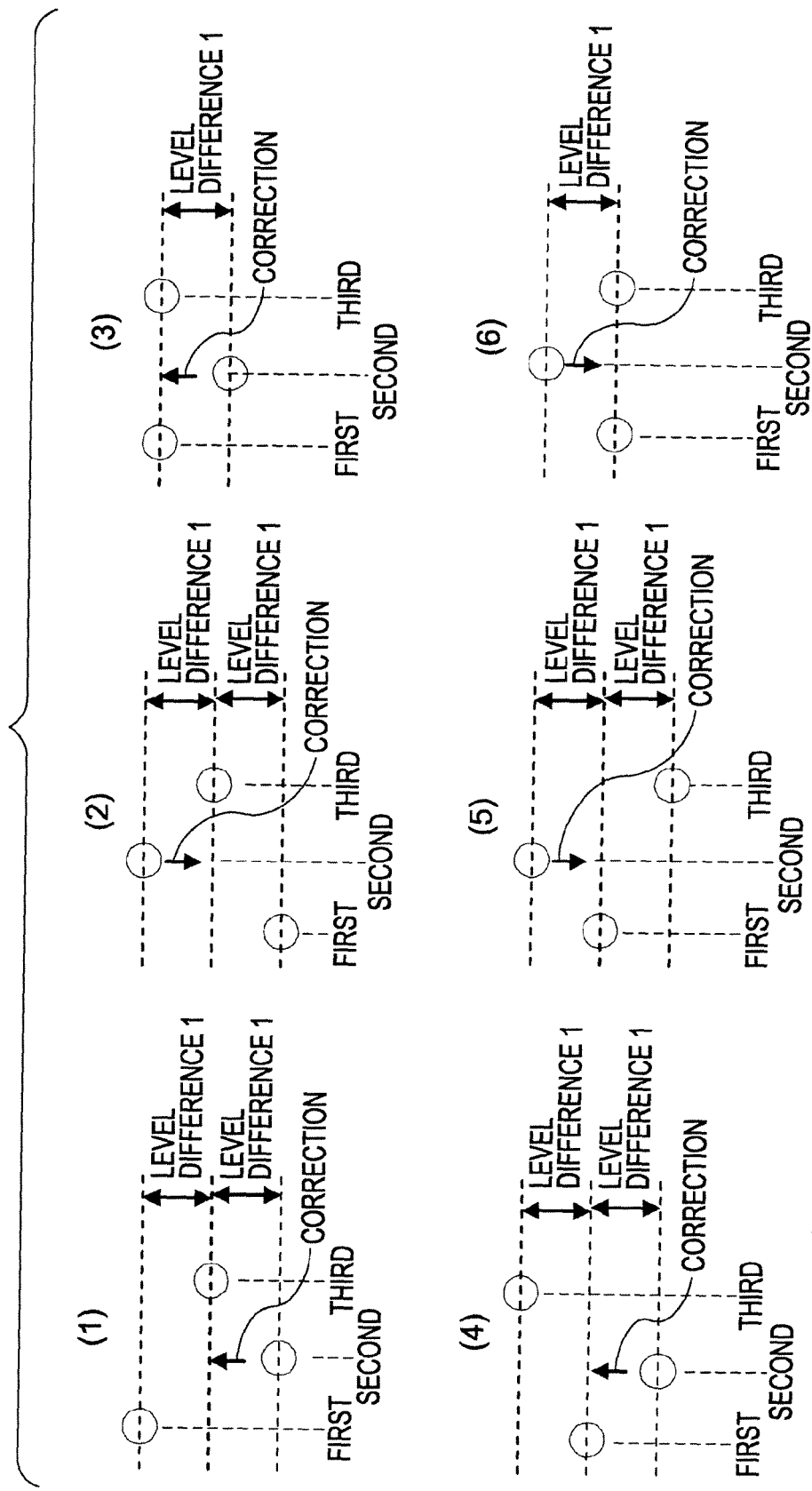
FIG. 2 is a diagram illustrating an example of noise suppression processing in a noise suppressing section.

The noise suppressing section 104 suppresses the fluctuations (noise components) of the lower 1-bit of a plurality of discrete data constituting the homogeneous-sample sting data Din. FIG. 2 illustrates examples of noise suppression processing in the noise suppressing section 104.

The processing example of (1) is the case where consecutive first to third discrete data have relationships in which the second discrete data is two levels lower than the first discrete data, and the third discrete data is one level lower than the first discrete data. The correction is performed so as to raise the level of the second discrete data by one level as shown by the arrow.

The processing example of (2) is the case where consecutive first to third discrete data have relationships in which the second discrete data is two levels higher than the first discrete data, and the third discrete data is one level higher than the first discrete data. The correction is performed so as to lower the level of the second discrete data by one level as shown by the arrow.

The processing example of (3) is the case where consecutive first to third discrete data have relationships in which the second discrete data is one level lower than the first discrete data, and the third discrete data is the same level as the first discrete data. The correction is performed so as to raise the level of the second discrete data by one level as shown by the arrow.

The processing example of (4) is the case where consecutive first to third discrete data have relationships in which the second discrete data is one level lower than the first discrete data, and the third discrete data is one level higher than the first discrete data. The correction is performed so as to raise the level of the second discrete data by one level as shown by the arrow.

The processing example of (5) is the case where consecutive first to third discrete data have relationships in which the second discrete data is one levels higher than the first discrete data, and the third discrete data is one level lower than the first discrete data. The correction is performed so as to lower the level of the second discrete data by one level as shown by the arrow.

The processing example of (6) is the case where consecutive first to third discrete data have relationships in which the second discrete data is one level higher than the first discrete data, and the third discrete data is the same level as the first discrete data. The correction is performed so as to lower the level of the second discrete data by one level as shown by the arrow.

In this manner, the fluctuations (often caused by noise components) of the lower one bit of a plurality of discrete data constituting the homogeneous-sample sting data Din are suppressed by providing the noise-suppressing section 104. Thus, it becomes possible for the homogeneity/heterogeneity conversion section 106 described below to prevent producing a curve different from the one generated using original right values, and to stably obtain a plurality of discrete data having heterogeneous time intervals.

The first-derivative adding section 105 adds a first derivative to each of the plurality of discrete data constituting the homogeneous-sample sting data Din, which has been subjected to the noise-suppression processing by the noise-suppressing section 104. Assuming that the discrete data to which a first derivative is added is target discrete data, the first-derivative adding section 105 generates a first derivative using the differences with the discrete data located before and after the target discrete data.

Here, if a difference between the adjacent discrete data and the target discrete data is greater than a predetermined value Dth, the adjacent discrete data is used as discrete data located before and after the target discrete data. If the difference is within the predetermined value Dth, the adjacent data and all the consecutive discrete data having a difference with the target discrete data not greater than the predetermined value Dth is used.

That is to say, a first derivative DT to be added to the target discrete data is calculated by Expression (1) using the difference DL between the target discrete data y and the discrete data located before and the difference DR between the target discrete data y and the discrete data located after.

$$DT = (DL + DR)/2 \quad (1)$$

DL in Expression (1) is calculated by Expression (2) when the difference $|l1-y|$ between the target discrete data y and the preceding discrete data l1 is greater than Dth.

$$DL = y - l1 \quad (2)$$

Also, DL in Expression (1) is calculated by Expression (3) when the difference $|y-l1|$ between the target discrete data y and the preceding discrete data l1 is Dth or less using the adjacent discrete data l1 and all (assuming L pieces) the discrete data which are continuous to the adjacent discrete data and have the difference within Dth from the discrete data y.

$$D_L = \frac{(y - l_1) + (y - l_2) + \ldots + (y - l_L)}{1 + 2 + \ldots + L} \quad (3)$$

On the other hand, DR in Expression (1) is calculated by Expression (4) when the difference $|r1-y|$ between the target discrete data y and the following discrete data r1 is greater than Dth.

$$DR = r1 - y \quad (4)$$

Also, DR in Expression (1) is calculated by Expression (5) when the difference $|r1-y|$ between the target discrete data y and the following discrete data r1 is Dth or less using the adjacent discrete data r1 and all (assuming R pieces) the discrete data which is continuous to the adjacent discrete data and has the difference from the discrete data y of Dth or less.

$$D_R = \frac{(r_1 - y) + (r_2 - y) + \ldots + (r_R - y)}{1 + 2 + \ldots + R} \quad (5)$$

Figure 3:
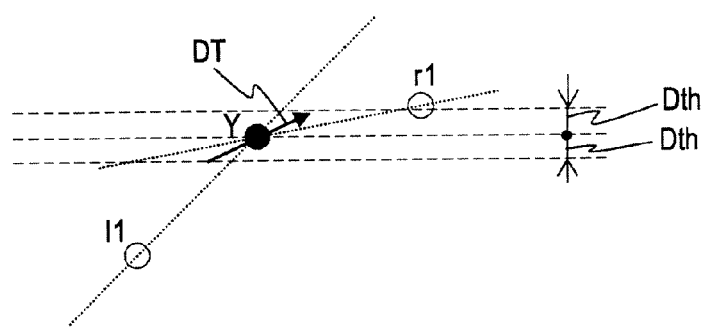
FIG. 3 is a diagram illustrating a method of calculating a first derivative DT.

FIG. 3 illustrates an example of a state in which the difference $|l1-y|$ between the target discrete data y and the preceding (left) discrete data l1 is greater than Dth, and the difference $|r1-y|$ between the target discrete data y and the following (right) discrete data r1 is greater than Dth. In this state, DL and DR are calculated by the above-described Expression (2) and Expression (4), respectively. The arrow in FIG. 3 shows a calculated first derivative.

Figure 4:
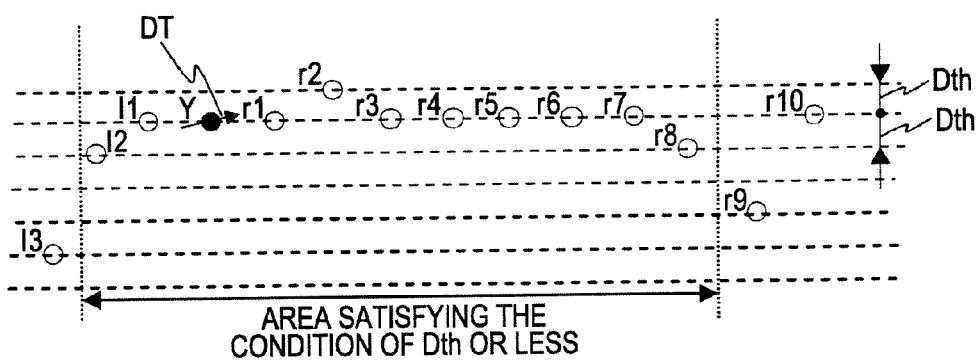
FIG. 4 is a diagram illustrating the method of calculating the first derivative DT.

FIG. 4 illustrates an example of a state in which the difference $|l1-y|$ between the target discrete data y and the preceding (left) discrete data l1 is Dth, and the difference $|r1-y|$ between the target discrete data y and the following (right) discrete data r1 is Dth or less.

In this state, DL is calculated by Expression (3) using the two discrete data l1 and l2 preceding the target discrete data y. Also, DR is calculated by Expression (5) using the eight discrete data r1 to r8 following the target discrete data y.

In this manner, when a first derivative is calculated, if the level values of the discrete data adjacent to the target discrete data are close, it becomes possible to obtain a first derivative which is close to the original consecutive waveform by viewing the data in a wide range. That is to say, it is possible to calculate a first derivative more correctly in a low-frequency range. The arrow in FIG. 4 shows the calculated first derivative DT.

The homogeneity/heterogeneity conversion section 106 performs thinning processing on a plurality of discrete data, which are obtained by the first-derivatives adding section 105 and have homogeneous time-intervals and additional first derivatives to generate a plurality of discrete data having heterogeneous time-intervals and the additional first-derivatives. In this case, when one or a plurality of discrete data interposed between two discrete data can be approximated by a curve which passes through the two discrete data and is generated on the basis of the discrete data, the first derivative, and the time interval information, the homogeneity/heterogeneity conversion section 106 thins one or a plurality of the discrete data, and generates a plurality of discrete data having heterogeneous time intervals, the additional first derivatives.

Figure 5:
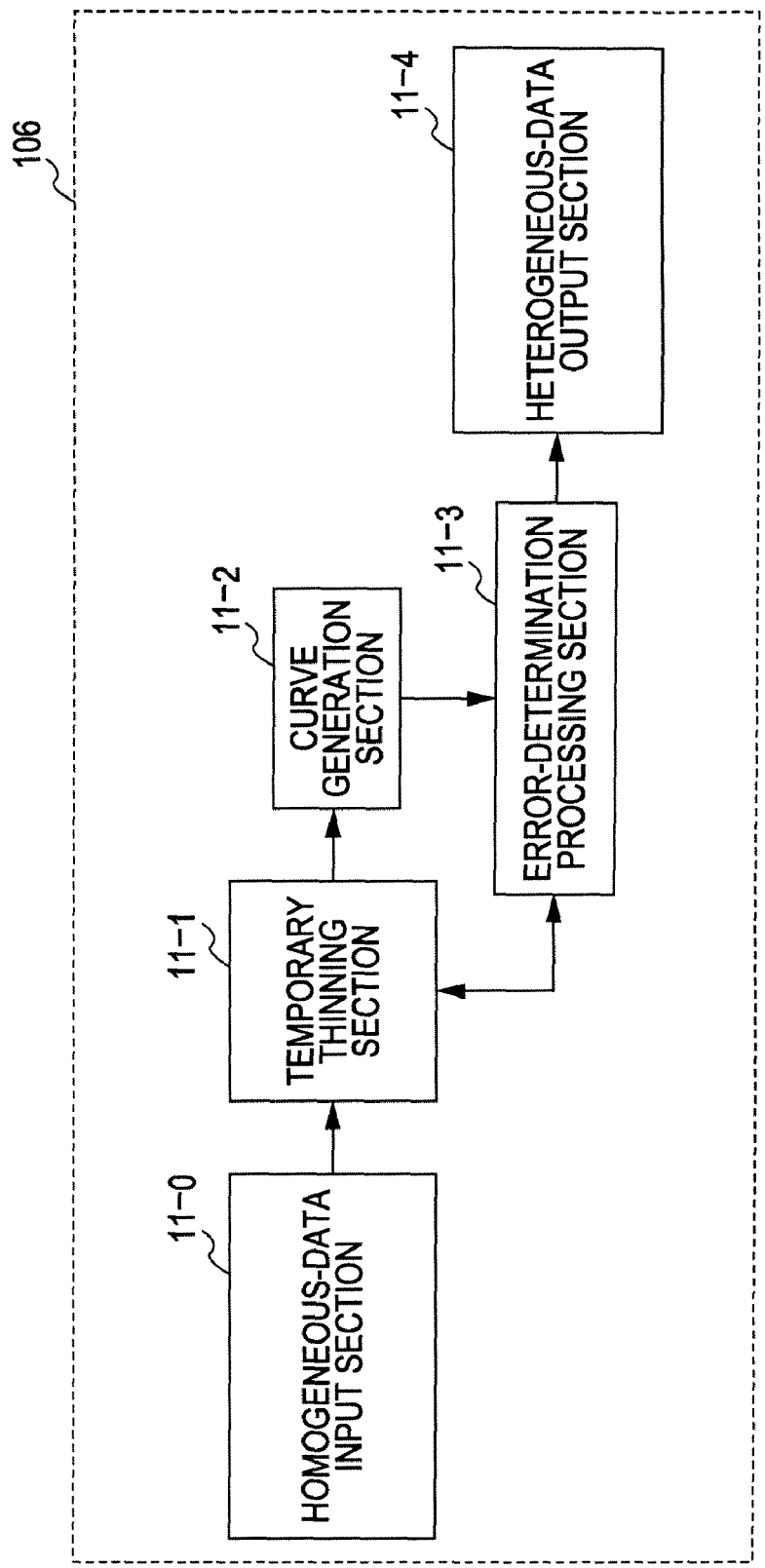
FIG. 5 is a diagram illustrating each functional block corresponding to each processing performed in a homogeneity/heterogeneity conversion section.

FIG. 5 illustrates each functional block corresponding to each processing performed in the homogeneity/heterogeneity conversion section 106. The homogeneity/heterogeneity conversion section 106 has a homogeneous-data input section 11-0, a temporary thinning section 11-1, a curve generation section 11-2, an error-determination processing section 11-3, and a heterogeneous-data output section 11-4.

The homogeneous-data input section 11-0 receives input of a plurality of the discrete data having homogeneous time-intervals and the additional first derivatives obtained by the first-derivatives adding section 105 as described above.

The temporary thinning section 11-1 temporarily thins the discrete data between the i-th and the j-th discrete data on a plurality of the discrete data input into the homogeneous-data input section 11-0, and sets the i-th and the j-th discrete data to the two discrete data for generating a curve and performing error-determination processing. First, it is assumed that i=1, and j=i+2.

In response to this setting, the curve generation section 11-2 generate a curve passing through these i-th and j-th discrete data positions on the basis of the i-th and the j-th discrete data, the first derivatives added to the i-th and the j-th discrete data, and the time interval information of the i-th and the j-th discrete data.

When the differences between the discrete data, which are interposed between the i-th and the j-th discrete data and are temporarily thinned by the temporary thinning section 11-1, and the corresponding values on the curve generated by the curve generation section 11-2 are all in an allowable error range, the error-determination processing section 11-3 determines that the (j−1)-th discrete data should be the discrete data not to be kept, and increases j by one in the temporary thinning section 11-1.

In response to this, the temporary thinning section 11-1 sets new i-th and j-th discrete data to the two discrete data for generating a curve and performing error determination processing. In response to this setting, the curve generation section 11-2 and the error-determination processing section 11-3 perform the same processing as described above.

On the other hand, when the differences between the discrete data, which are interposed between the i-th and the j-th discrete data and are temporarily thinned by the temporary thinning section 11-1, and the corresponding values on the curve generated by the curve generation section 11-2 are not within the allowable error range, the error-determination processing section 11-3 determines that the (j−1)-th discrete data should be the discrete data to be kept, and changes i and j in the temporary thinning section 11-1 as follows. That is to say, i is set to be j−1, and j is set to be i+1 using i.

In response to this, the temporary thinning section 11-1 sets new i-th and j-th discrete data to the two discrete data for generating a curve and performing error determination processing. In response to this setting, the curve generation section 11-2 and the error-determination processing section 11-3 perform the same processing as described above.

In this regard, the error-determination processing section 11-3 determines that the first discrete data should be the discrete data to be kept all the time. Also, the above-described processing in the temporary thinning section 11-1, the curve generation section 11-2, and the error-determination processing section 11-3 is repeated until j becomes greater than P assuming that the number of the discrete data input into the homogeneous-data input section 11-0 is P.

The heterogeneous-data output section 11-4 outputs a plurality of the discrete data having heterogeneous time-intervals and the additional first derivatives, which have been determined to be the discrete data to be kept in the error-determination processing section 11-3 out of a plurality of the discrete data input into the homogeneous-data input section 11-0 as described above.

Figure 6:
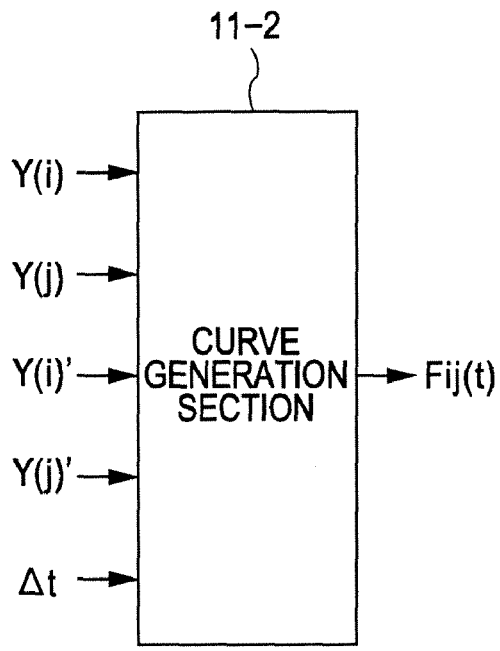
FIG. 6 is a diagram illustrating input/output of a curve generation section.

A further description will be given of the curve generation section 11-2. As shown in FIG. 6, the curve generation section 11-2 generates the curve Fij(t) passing through the i-th and the j-th discrete data positions on the basis of the i-th discrete data Y(i), the first derivative Y(i)' added thereto, the j-th discrete data Y(j), the first derivative Y(j)' added thereto, and the time interval information Δt between the i-th and the j-th discrete data.

Figure 7:
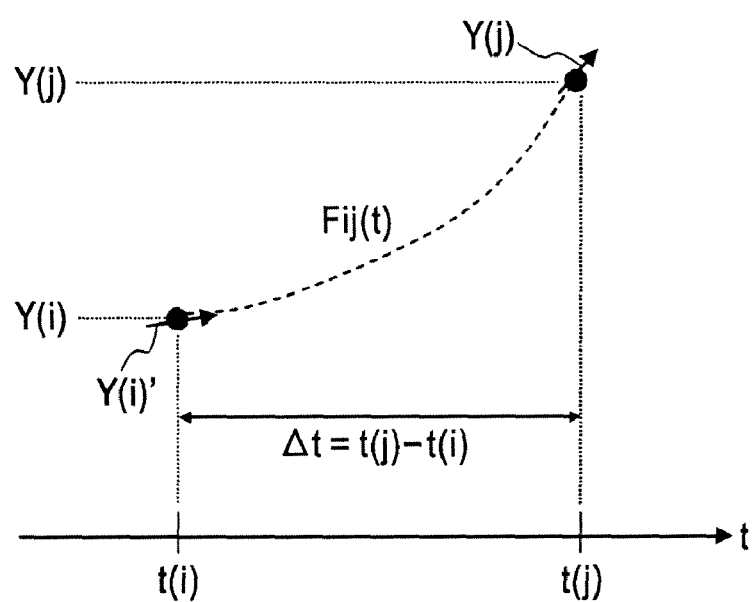
FIG. 7 is a diagram illustrating curve generation processing using discrete data Y(i), Y(j), first derivatives Y(i)', Y(j)', and time interval information Δt.

FIG. 7 illustrates individual values and an image of the curve Fij(t) generated on the basis of those values. In this regard, in FIG. 7, t(i) and t(j) illustrate points in time corresponding to the discrete data Y(i) and Y(j), respectively.

The curve generation section 11-2 generates, for example, the cubic curve Fij(t) on the basis of Expression (6).

$$F_{ij}(t) = \text{coef3} \times X^3 + \text{coef2} \times X^2 + \text{coef1} \times X + \text{coef0} \quad (6)$$

In this regard, coef3, coef2, coef1, coef0, and X are calculated by the following Expressions (7) to (11) using Y(i), Y(j), Y(i)', Y(j)', and Δt, respectively.

$$\text{coef3} = -2(Y(j) - Y(i)) + \Delta t \times (Y(j)\prime + Y(i)\prime) \quad (7)$$

$$\text{coef2} = 3(Y(j) - Y(i)) - \Delta t \times (Y(j)\prime + 2Y(i)\prime) \quad (8)$$

$$\text{coef1} = \Delta t \times Y(i)\prime \quad (9)$$

$$\text{coef0} = Y(i) \quad (10)$$

$$X = \frac{t - t(i)}{\Delta t} \quad (11)$$

Figure 8:
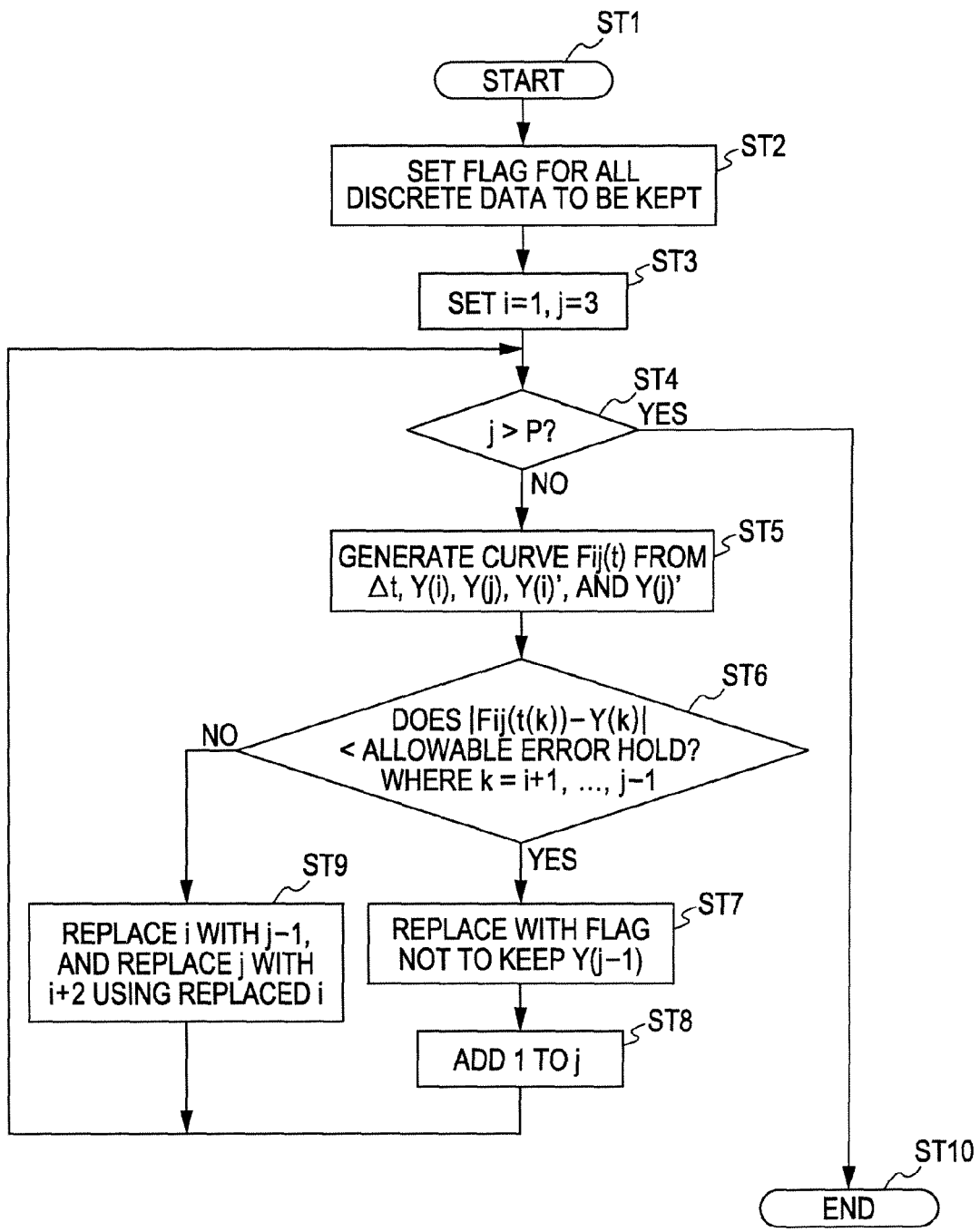
FIG. 8 is a flowchart illustrating the processing operation of the homogeneity/heterogeneity conversion section.
Figure 9:
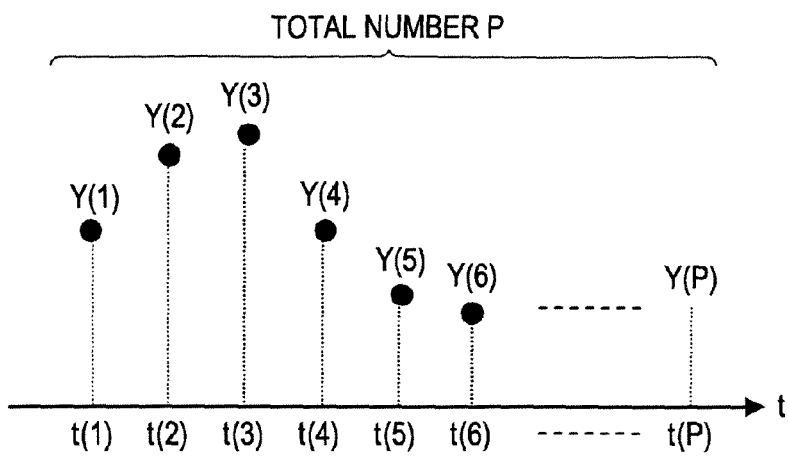
FIG. 9 is a diagram illustrating an example of discrete data having homogeneous time intervals.

Next, a description will be given of the processing procedure of the homogeneity/heterogeneity conversion section 106 with reference to the flowchart in FIG. 8. Here, as shown in FIG. 9, a description will be given of the case where P discrete data Y(1) to Y(P) are input into the homogeneous-data input section 11-0. The P discrete data Y(1) to Y(P) correspond to the points t(1) to t(P) in time, respectively.

First, the processing is started in step ST1, and the flag is set for all P discrete data Y(1) to Y(P) to be kept. In step ST3, i and j are set such that i=1, j=i+2. Here, i and j are used for identifying two discrete data for generating a curve and performing error determination.

Next, in step ST4, a determination is made on whether j has exceeded the total number P. If j>P, it means that the processing for all the discrete data Y(1) to Y(P) has been completed, and thus the processing ends in step ST10. On the other hand, if j≦P in step ST4, the processing proceeds to step ST5.

In step ST5, curve Fij(t) is generated using Y(i), Y(i)', Y(j), Y(j)', and Δt. In step ST6, a comparison is made of whether the differences between discrete data Y(i+1) to Y(j−1) interposed between the i-th discrete data Y(i) and the j-th discrete data Y(j) and the corresponding values Fij (t(i+1)) to Fij (t(j−1)) on the curve Fij(t) are all within an allowable error range, for example in a level range of least significant bit.

If |Fij(t(k))−Y(k)|<allowable error (k=i+1 to j−1), it means that the discrete data Y (j−1) can be interpolated by the generation of the same curve as in step ST5. Thus, the flag of the discrete data Y (j−1) is replaced by the flag not to be kept in step ST7. In ST8, j is increased by 1. After that, the processing returns to step ST4, and the same processing as described above is repeated.

Figure 10:
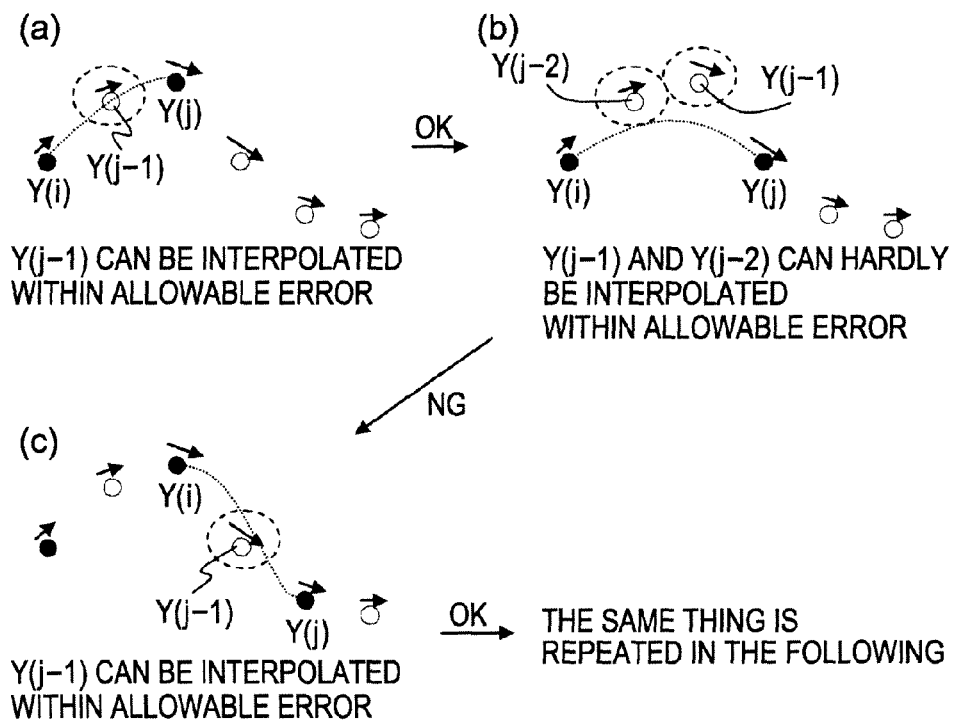
FIG. 10 is a diagram illustrating a specific example of the homogeneity/heterogeneity conversion processing.

For example, as shown in FIG. 10(*a*), if the discrete data Y(j−1) interposed between the i-th discrete data Y(i) and the j-th discrete data Y(j) can be interpolated within a range of an allowable error, as shown in FIG. 10(*b*), j is increased by 1, and a curve is similarly generated. Then, a determination is made on whether the discrete data Y(j−1) and Y(j−2) interposed between the i-th discrete data Y(i) and the j-th discrete data Y(j) can be interpolated within a range of an allowable error.

On the other hand, if not |Fij(t(k))−Y(k)|<allowable error (k=i+1 to j−1), it means that the discrete data Y (j−1) can be hardly interpolated by the generation of the same curve as in step ST5. Thus, in step ST9, i is replaced by j−1, j is replaced by i+2 using the replaced i. In this case, the flag of discrete data Y (j−1) remains to be set for keeping the data in step ST2. After the processing in step ST9, the processing returns to step ST4, and the same processing as described above is repeated.

For example, as shown in FIG. 10(*b*), if discrete data Y(j−1) and Y(j−2) interposed between the i-th discrete data Y(i) and the j-th discrete data Y(j) can be hardly interpolated within a range of an allowable error, as shown in FIG. 10(*c*), i is replaced by j−1, j is replaced by i+2 using the replaced i, and a curve is similarly generated. Then, a determination is made on whether the discrete data Y(j−1) interposed between the i-th discrete data Y(i) and the j-th discrete data Y(j) can be interpolated within a range of an allowable error.

Figure 11:
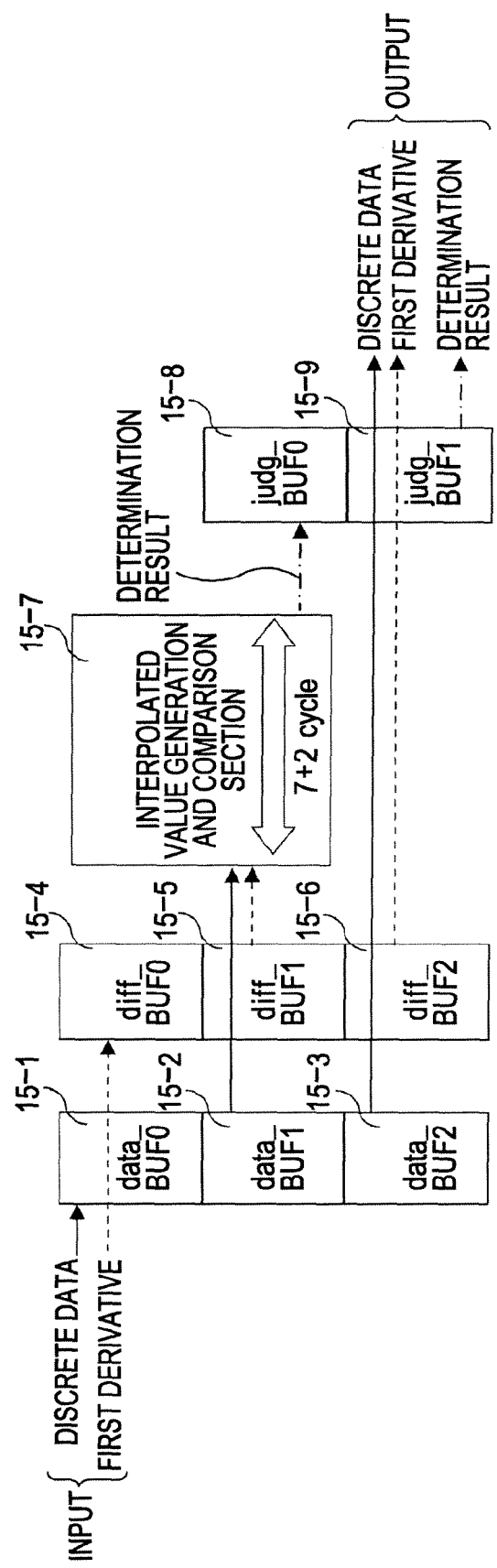
FIG. 11 is a block diagram illustrating the circuit configuration of the homogeneity/heterogeneity conversion section.

FIG. 11 illustrates an example of the circuit configuration of the homogeneity/heterogeneity conversion section 106. This example of the circuit configuration achieves the homogeneity/heterogeneity conversion processing in real time. Here, it is assumed that the bit width of the time interval information Δt of the discrete data to be kept is 4 bits, and 15 discrete data are consecutively thinned at the maximum.

The homogeneity/heterogeneity conversion section 106 has data buffers (data_BUF) 15-1 to 15-3, derivative buffers (diff_BUF) 15-4 to 15-6, an interpolated-value generation and comparison section 15-7, and determination result buffers (judg_BUF) 15-8 and 15-9.

The discrete data and the first derivative are individually input at one data/one cycle. The discrete data is stored into the data buffer 15-1, and the first derivative is stored into the derivative buffer 15-4. Here, the data buffer 15-1, and the derivative buffer 15-4 are called frame 0 on the whole. The frame0 internally includes 9 data groups (in the following, called a "packet") including 16 data as a bunch.

When the frame 0 is fully filled with data, then the one frame of data is read out, and sent and stored in the data buffer 15-2, and the derivative buffer 15-5. Here, the data buffer 15-2, and the derivative buffer 15-5 are called frame1 on the whole. The interpolated-value generation and comparison section 15-7 starts the homogeneity/heterogeneity conversion processing, that is to say, the processing for determining whether each discrete data is to be kept or not using the data stored in the frame1.

The determination result corresponding to each discrete data obtained by the interpolated-value generation and comparison section 15-7 is stored into the determination result buffer 15-8. For example, flag1 is set to the discrete data determined to be kept, and flag0 is set to the discrete data determined not to be kept, namely, to be tinned.

When all the homogeneity/heterogeneity conversion processing in the interpolated-value generation and comparison section 15-7 using the data stored in the frame1 is completed, then one-frame data stored in the frame1 is read, and is sent and stored in the data buffer 15-3 and the derivative buffer 15-6. At the same time, the determination result for one frame, stored in the determination result buffer 15-8, is read out and is sent and stored into the determination result buffer 15-9. Here, the data buffer 15-3, and the derivative buffer 15-6 are called frame2 on the whole.

On the basis of the determination result stored in the determination result buffer 15-9, the discrete data determined to be kept and the first derivatives added thereto are read in sequence from the frame2 and are output. In this regard, the determination result read from the determination result buffer 15-9 is output in exact timing with the output of the discrete data and the first derivatives. As described below, this determination result is used in the heterogeneous-data generation section 107 at the time of resetting the counter for obtaining the time interval information Δt.

Figure 12:
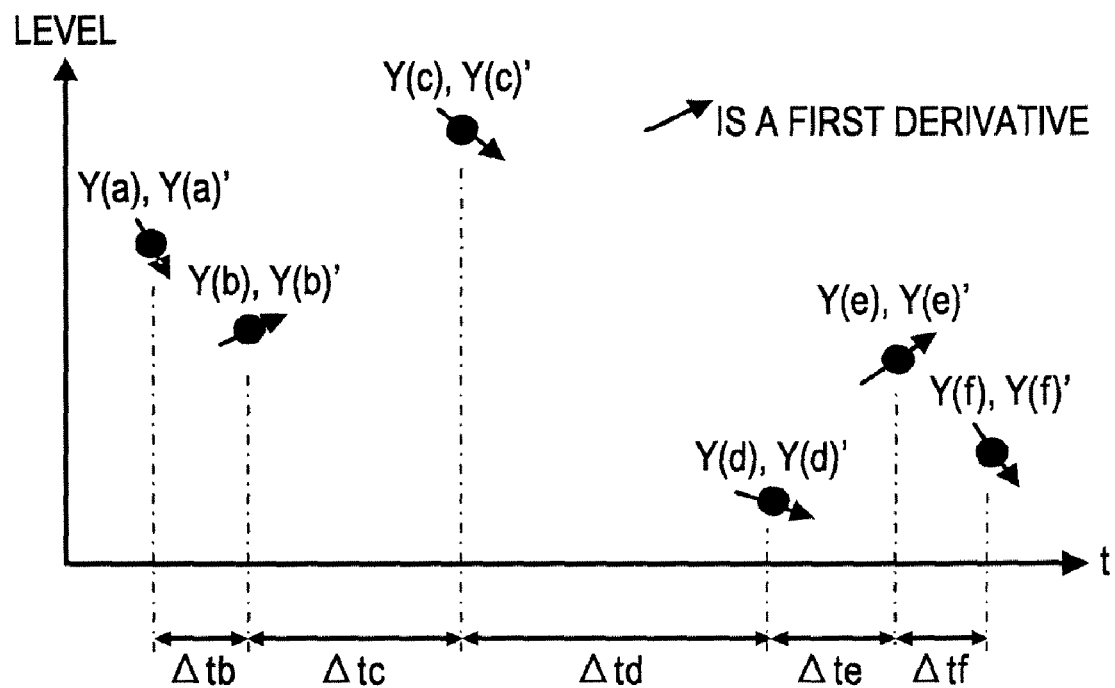
FIG. 12 is a diagram illustrating an example of a heterogeneous sample string.

FIG. 12 illustrates an example of a plurality of discrete data (heterogeneous sample string) having heterogeneous time intervals and additional first derivatives, which are output from the homogeneity/heterogeneity conversion section 106. In this example, next to the discrete data Y(a) and the first derivative Y(a)' at the point ta in time, the discrete data Y(b) and the first derivative Y(b)' are output at the point tb in time after the time interval of Δtb. Also, next to the discrete data Y(b) and the first derivative Y(b)' at the point tb in time, the discrete data Y(c) and the first derivative Y(c)' are output at the point tc in time after the time interval of Δtc. In the following, in the same manner, the discrete data determined to be kept are sequentially output at predetermined time intervals.

Figure 13:
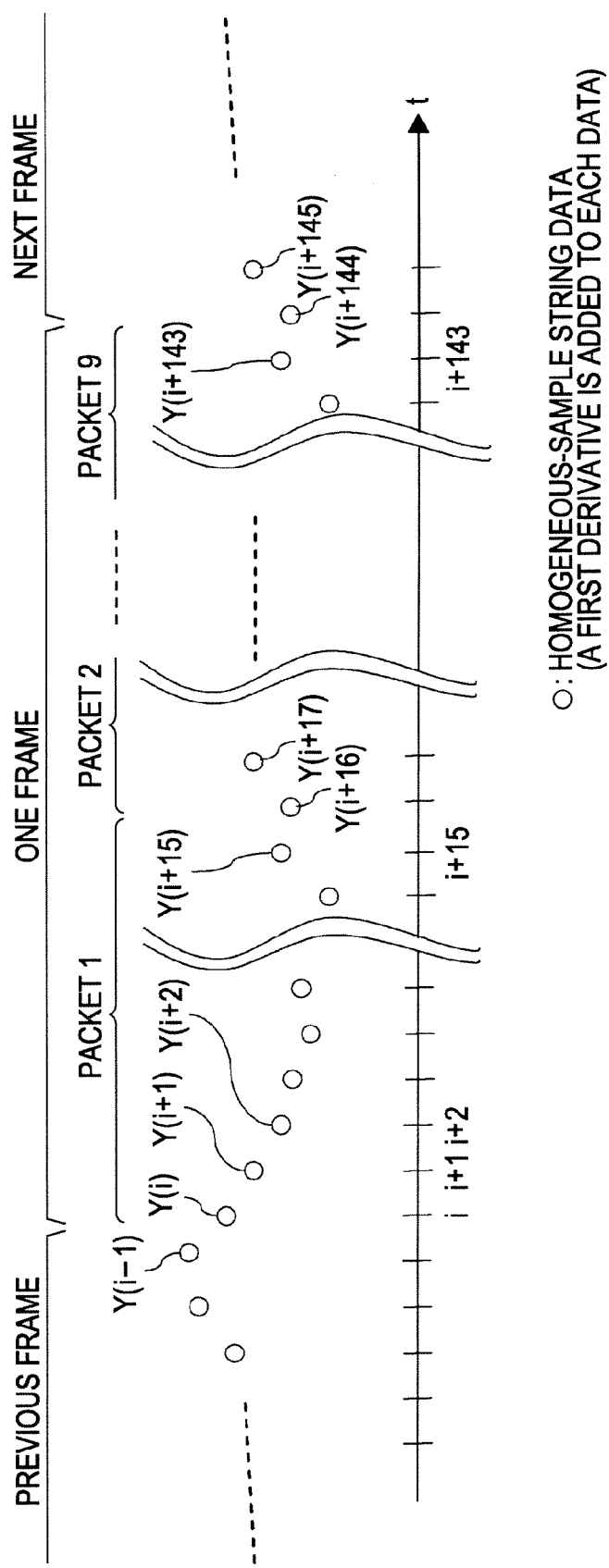
FIG. 13 is a diagram specifically illustrating how data is stored into the buffer of the homogeneity/heterogeneity conversion section.

FIG. 13 specifically illustrates how data is stored into the buffers in the circuit configuration of the homogeneity/heterogeneity conversion section 106 shown in FIG. 11. One packet is formed for each 16 input data with the additional first derivatives. The formed packets are called packet1, packet2, packet3, . . . , and 9 packets constitute one frame data.

In FIG. 13, when the first data of packet1 corresponds to the data at time t, the packet1 includes data Y(i), Y(i+1), . . . , Y(i+15), and the first derivative Y(i), Y(i+1)', . . . , Y(i+15)'. Similarly, the packet2 includes data Y(i+16), Y(i+17), . . . , Y(i+31), and the first derivative Y(i+16)', Y(i+17)', . . . , Y(i+31)'. In the following, the packet3, the packet4, . . . are formed in the same manner. The packet9 includes data Y(i+128), Y(i+129), . . . , Y(i+143), and the first derivative Y(i+128)', Y(i+129)', . . . , Y(i+143)'. The data of each packet as the input data are stored in the frame0. When 9-packet data is stored the frame0, the data is sent to the frame1.

Figure 14:
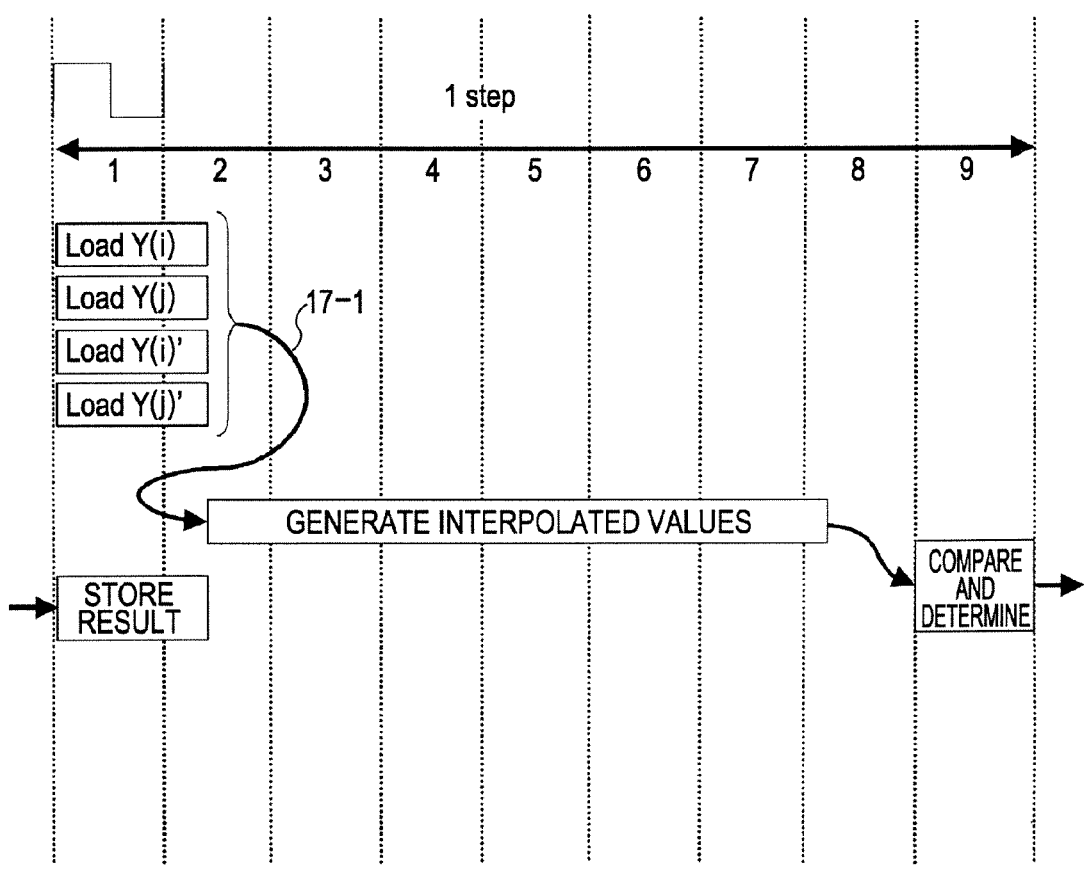
FIG. 14 is a timing chart illustrating the processing sequence of an interpolated-value generation/comparison section.

Next, a specific description will be given of the homogeneity/heterogeneity conversion processing performed by the interpolated-value generation and comparison section 15-7 using the data stored in frame1. As described using the functional block diagram in FIG. 5 and the flowchart in FIG. 8, in the homogeneity/heterogeneity conversion processing, the curve Fij (t) passing through the i-th and the j-th discrete data positions is generated on the basis of the i-th discrete data Y(i), the first derivative Y(i)' added thereto, the j-th discrete data Y(j), the first derivative Y(j) added thereto, and the time interval information Δt between the i-th and j-th discrete data. A comparison is made on whether the differences of the discrete data Y(i+1) to Y(j−1) interposed between the i-th Y(i) and the j-th discrete data Y(j), and the corresponding values (interpolated values) on the curve Fij(t) are all within a range of an allowable error in order to determine whether to keep the (j−1)-th discrete data Y(j−1). Here, this process is called one step. The timing chart of the hardware in one step is shown in FIG. 14.

First, certain two discrete data Y(i) and Y(j), and the first derivatives Y(i)' and Y(j)' are loaded from the data buffer 15-2 and the derivative buffer 15-5, respectively. The number of cycles necessary for this loading is two.

Next, the interpolated values at the points t(i+1) to t(j−1) in time are calculated on the basis of the discrete data Y(i) and Y(j), the first derivatives Y(i)' and Y(j)', and the time interval information Δt. In this regard, the generation of the interpolated values can be started in the middle of the second cycle by employing the configuration of sending the data Y(i) and Y(j), and the first derivatives Y(i)' and Y(j)', loaded from the buffers 15-2 and 15-5, respectively, to the interpolated-value generation and comparison section 15-7 without passing through a flip-flop, etc. The arrow 17-1 in the figure represents this. The number of cycles necessary for the generation of the interpolated values is 7 as described below. In this regard, the detailed configuration of the interpolation-value generation section in the interpolated-value generation and comparison section 15-7 will be described later.

Next, a comparison is made on whether the differences between the discrete data Y(i+1) to Y(j−1) and the interpolated values at the points t(i+1) to t(j−1) in time are all within an allowable error. The determination result is stored in the determination result buffer 15-8. The processing of the next step can be started while the determination result is stored in the determination result buffer 15-8 in this manner.

As described above, the number of cycles for one step is virtually 9. However, this means that 9 cycles are necessary for determining whether to thin one discrete data. Thus, the data that is input at one data/one cycle is difficult to be processed.

Figure 15:
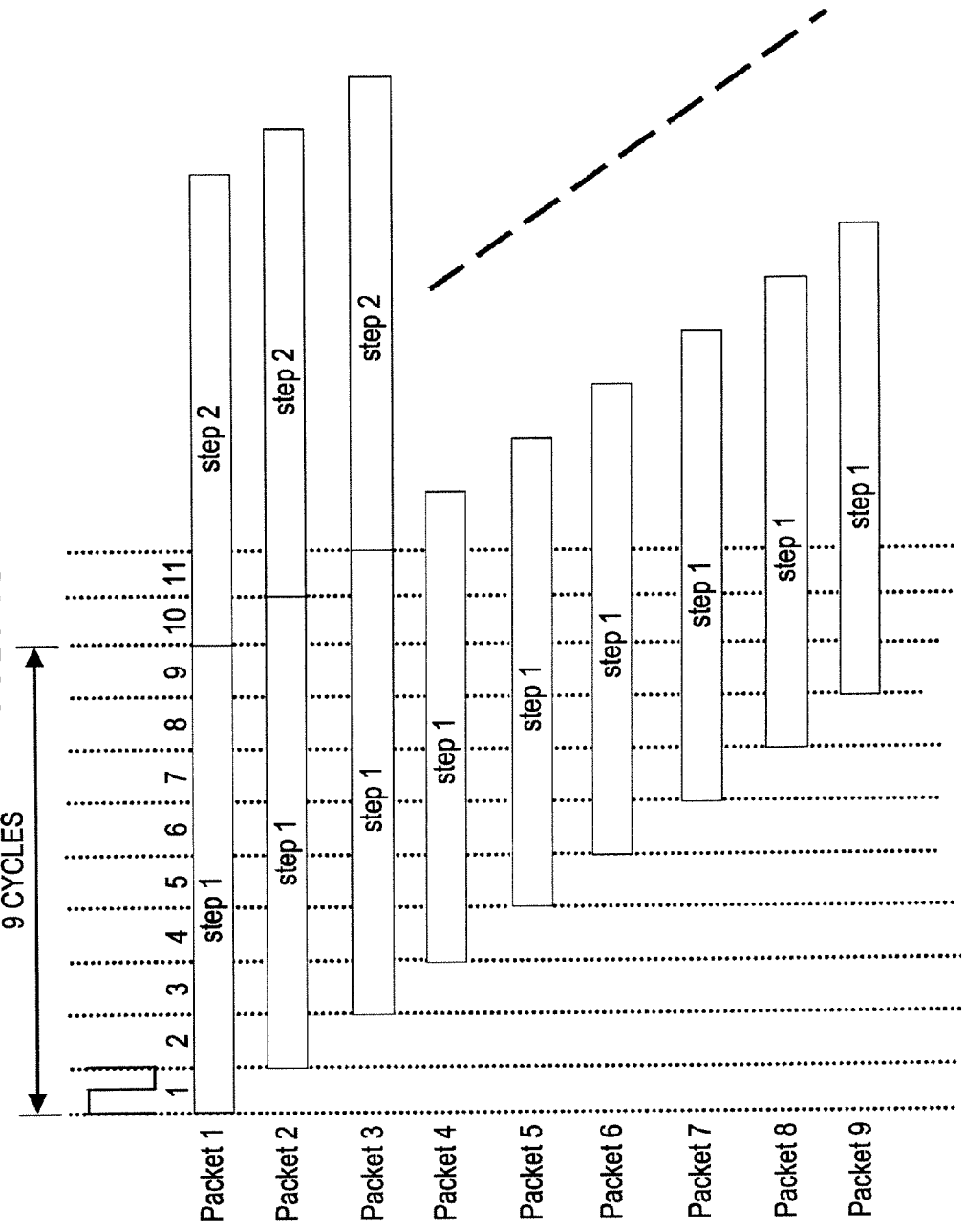
FIG. 15 is a diagram illustrating 9-packet parallel processing in the interpolated-value generation/comparison section.

Accordingly, as shown in FIG. 15, 9 packets in one frame are processed in parallel for achieving real-time processing. That is to say, the flow of the data processing in frame1 is as follows. The step1 of the packet1 is started in the first cycle, the step1 of the packet2 is started in the second cycle, the step1 of the packet3 is started in the third cycle, . . . , and the step1 of the packet9 is started in the ninth cycle. Similarly, the determination result of packet1 of which step1 has been started in the first cycle is obtained, and thus the step2 of packet1 is started on the basis of the result in the tenth cycle. In the following, 9 packets are processed in parallel by the repetition of the same process. In this manner, each packet is sequentially processed in parallel, and thus the pipeline processing in the interpolated-value generation and comparison section 15-7 can be executed continuously.

Figure 16:
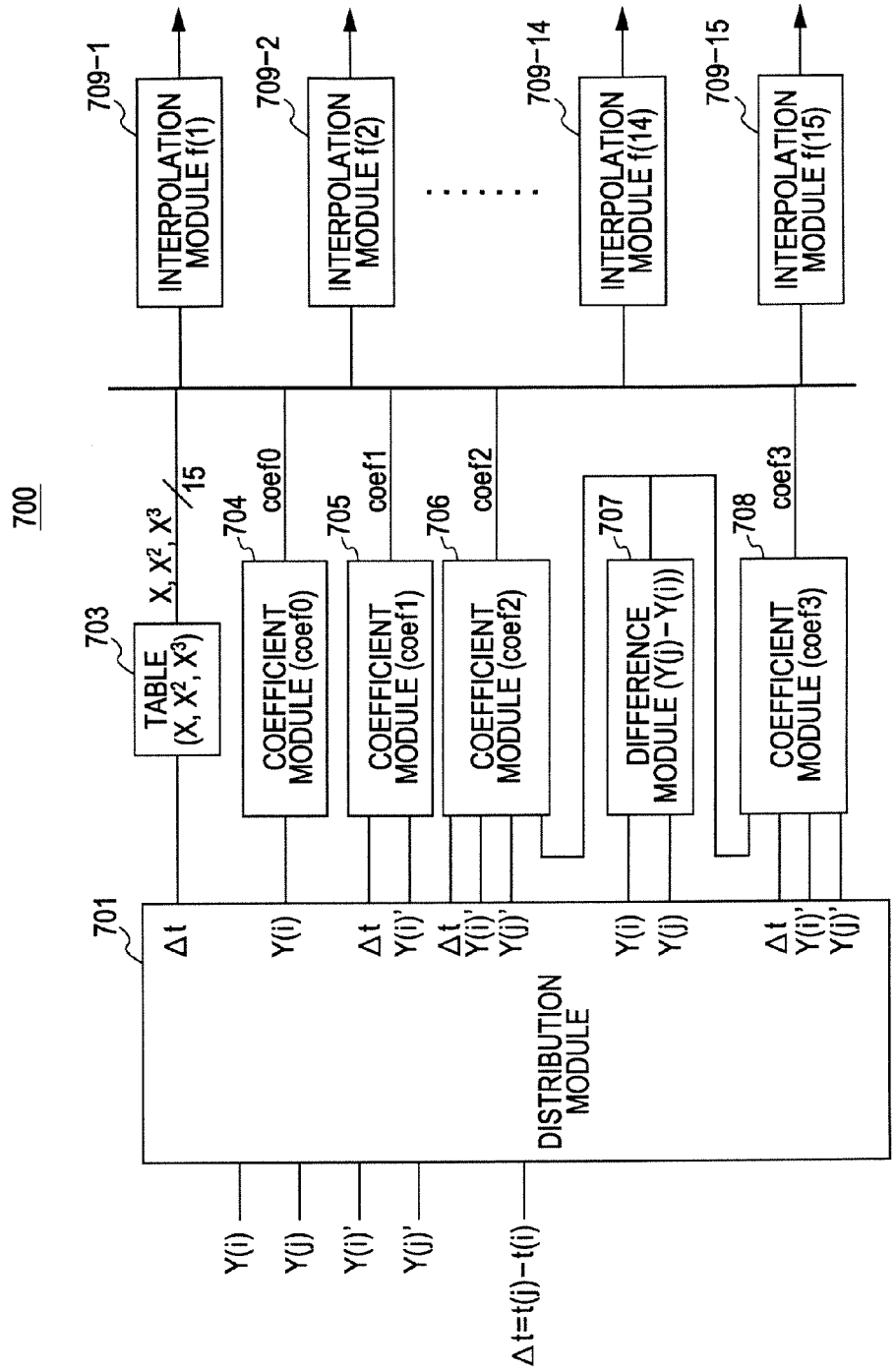
FIG. 16 is a block diagram illustrating the configuration of the interpolated-value generation section constituting the interpolated-value generation/comparison section.

Next, a description will be given of an interpolated-value generation section 700 in the interpolated-value generation and comparison section 15-7. FIG. 16 illustrates the detailed configuration of the interpolated-value generation section 700. The interpolated-value generation section 700 has a distribution module 701, a table 703, coefficient modules 704 to 706 and 708, a difference module 707, and interpolation modules 709-1 to 709-15.

The distribution module 701 distributes and supplies the input discrete data Y(i) and Y(j), the first derivatives Y(i)' and Y(j)', and the time interval information Δt to the table 703, the coefficient modules 704 to 706 and 708, and the difference module 707, respectively. That is to say, the distribution module 701 supplies Δt to the table 703, supplies Y(i) to the coefficient module 704, supplies Δt and Y(i)' to the coefficient modules 705, supplies Δt, Y(i)', and Y(j)' to the coefficient modules 706, supplies Y(i) and Y(j) to the difference module 707, and supplies Δt, Y(i)', and Y(j)' to the coefficient module 708.

In this regard, the discrete data Y(i) and Y(j) and the first derivatives Y(i)' and Y(j)' are loaded from the external buffers 15-2 and 15-5 to the interpolated-value generation and comparison section 15-7 (refer to FIG. 11). However, the time interval information Δt=t(j)−t(i) is internally generated in the interpolated-value generation and comparison section 15-7.

The table 703 takes in the time interval information Δt supplied from the distribution module 701, and outputs the values of X, $X^2$, and $X^3$ in Expression (6) described above on the basis of the time interval information Δt. As described above, the bit width of the time interval information Δt is 4 bits, and thus the homogeneity/heterogeneity conversion section 106 continuously thins 15 discrete data at the maximum. The values of X, $X^2$, and $X^3$ individually corresponding to S points t(i+1) to t(j−1) in time are obtained from the table 703. Here, the maximum value of S is 15.

The coefficient module 704 takes in the discrete data Y(i) supplied from the distribution module 701, and outputs the discrete data Y(i) directly as the coefficient coef0 (refer to Expression (10)). The coefficient modules 705 takes in the time interval information Δt and the first derivative Y(i)', which are supplied from the distribution module 701, and calculates the coefficient coef1 in Expression (6) described above by Expression (9) on the basis of those.

The difference module 707 takes in the discrete data Y(i) and Y(j), which are supplied from the distribution module 701, and calculates the difference value (Y(j)−Y(i)) on the basis of the data. The difference module 707 individually supplies the calculated difference value (Y(j)−Y(i)) to the coefficient modules 706 and the coefficient modules 708.

The difference module 706 takes in the time interval information Δt and the first derivatives Y(i)' and Y(j)' supplied from the distribution module 701, and the difference value (Y(j)−Y(i)) supplied from the difference module 707. The difference module 706 calculates the coefficient coef2 in Expression (6) described above on the basis of those. The coefficient module 708 takes in the time interval information Δt, the first derivatives Y(i)' and Y(j)' supplied from the distribution module 701, and the difference value (Y(j)−Y(i)) supplied from the difference module 707. The coefficient module 708 calculates the coefficient coef3 in Expression (6) described above by Expression (7) on the basis of those.

The interpolation modules 709-1 to 709-15 generates in parallel the values (interpolated values) f(1) to f(S) on the curve Fij(t) corresponding to the discrete data Y(i+1) to Y(j−1) interposed between the i-th discrete data Y(i) and the j-th discrete data Y(j) on the basis of Expression (6) using the coefficients coef0 to coef2 calculated by the coefficient modules 704 to 706, respectively, the coefficient coef3 calculated by the coefficient module 708, and further the values of X, $X^2$, and $X^3$ corresponding to the S points t(i+1) to t(j−1) in time output from the table 703. As described above, the maximum value of S is 15, and thus 15 interpolation modules 709-1 to 709-15 are provided as interpolation modules.

A description will be given of the operation of the interpolated-value generation section 700. The discrete data Y(i) and Y(j), the first derivatives Y(i)' and Y(j)', and the time interval information Δt are supplied to the distribution module 701. The time interval information Δt is supplied from the distribution module 701 to the table 703. The values of X, $X^2$, and $X^3$ corresponding to the S points t(i+1) to t(j−1) in time interposed between the points t(i) and t(j) are obtained in parallel from the table 703, and are supplied to the interpolation modules 709-1 to 709-S, respectively.

The discrete data Y(i) is supplied from the distribution module 701 to the coefficient module 704, and the discrete data Y(i) is directly output from the coefficient module 704 as the coefficient coef0. Also, the time interval information Δt and the first derivatives Y(i)' are supplied from the distribution module 701 to the coefficient module 705, and the coefficient module 705 calculates the coefficient coef1 on the basis of Expression (9).

The discrete data Y(i) and Y(j) are supplied from the distribution module 701 to the difference module 707, and the difference module 707 calculates the difference value (Y(j)−Y(i)). The difference value (Y(j)−Y(i)) is individually supplied to the coefficient modules 706 and 708. Also, the time interval information Δt and the first derivatives Y(i)' and Y(j)' are supplied from the distribution module 701 to the coefficient module 706, and the coefficient module 706 calculates the coefficient coef2 on the basis of Expression (8). Also, the time interval information Δt and the first derivatives Y(i)' and Y(j)' are supplied from the distribution module 701 to the coefficient module 708, and the coefficient module 708 calculates the coefficient coef3 on the basis of Expression (7).

The coefficients coef0 to coef2 calculated by the coefficient modules 704 to 706, and the coefficient coef3 calculated by the coefficient module 708 are supplied to the interpolation modules 709-1 to 709-S, respectively. The interpolation modules 709-1 to 709-S generate in parallel the interpolated values f(1) to f(S) on the curve Fij(t) corresponding to the discrete data Y(i+1) to Y(j−1) interposed between the i-th discrete data Y(i) and the j-th discrete data Y(j) on the basis of Expression (6) using the coefficients coef0 to coef3 and the values of X, $X^2$, and $X^3$.

In this regard, in the interpolated-value generation section 700 shown in FIG. 16, new discrete data Y(i) and Y(j), the first derivatives Y(i)' and Y(j)', and the time interval information Δt are supplied to the distribution module 701 for each cycle. At the same time, each processing is performed by pipeline processing so that the interpolated values f(1) to f(S) are output at a throughput of one output/one cycle from the interpolation modules 709-1 to 709-S.

Figure 17:
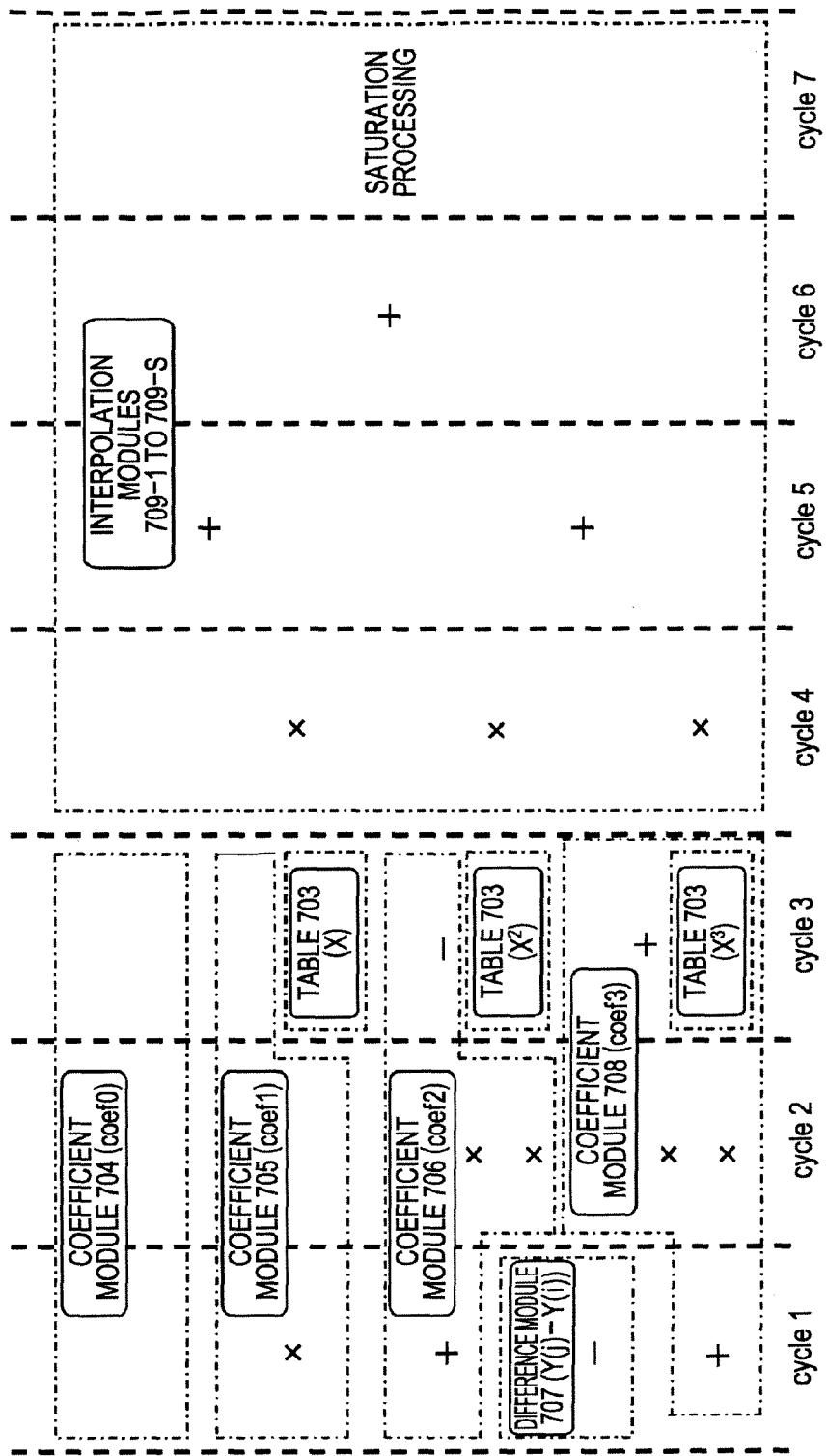
FIG. 17 is a diagram illustrating a calculation process of pipeline processing in the interpolated-value generation section.

FIG. 17 illustrates the calculation process of the pipeline processing.

In the first cycle, the coefficient module 705 multiplies Δt and Y(i)' for obtaining the coefficient coef1, the coefficient module 706 adds Y(j)' and 2 Y(i)', the difference module 707 subtracts Y(i) from Y(j) for obtaining the difference value (Y(j)−Y(i)), and the coefficient module 708 adds Y(j)' and Y(i)' for obtaining the coef3.

In the second cycle, the coefficient module 706 multiplies 3 and (Y(j)−Y(i)), multiplies Δt and (Y(j)'+2Y(i)') for obtaining the coefficient coef2, and the coefficient module 708 multiplies −2 and (Y(j)−Y(i)), and multiplies Δt and (Y(j)'+Y(i)') for obtaining the coefficient coef3.

In the third cycle, the coefficient module 706 performs subtraction between 3(Y(j)−Y(i)) and Δt×(Y(j)'+2Y(i)') for obtaining the coefficient coef2, and the coefficient module 708 adds −2(Y(j)−Y(i)) and Δt×(Y(j)'+Y(i)') for obtaining the coefficient coef3. Also, in the third cycle, the values of X, $X^2$, and $X^3$ are obtained from the table 703 on the basis of Δt.

In the fourth cycle, the interpolation modules 709-1 to 709-S multiplies the coefficient coef1 obtained by the coefficient module 705 and X obtained from the table 703, multiplies the coefficient coef2 obtained by the coefficient module 706 and $X^2$ obtained from the table 703, and multiplies the coefficient coef3 obtained by the coefficient module 708 and $X^3$ obtained from the table 703.

In the fifth cycle, the interpolation modules 709-1 to 709-S adds the coefficient coef0 obtained by the coefficient module 704 and (coef1×X), and further adds (coef2×$X^2$) and (coef3×$X^3$).

In the sixth cycle, (coef1×X+coef0) and (coef3×$X^3$+coef2×$X^2$) are added. In the seventh cycle, the saturation processing is performed. The saturation processing is, for example, the processing for clipping the interpolated value to 255 when the interpolated value is represented by 8 bits, and if the interpolated value generated in the above-described calculation exceeds 255.

In the above-described pipeline processing, the interpolated values f(1) to f(S) corresponding to predetermined Y(i), Y(j), Y(i)', Y(j)', Δt input to the distribution module 701 are output with a delay of 7 cycles. In this manner, it becomes possible to process consecutive input data by using pipeline processing for each processing of the interpolated-value generation section 700. In this regard, the distribution module 701 holds data for a certain period of time in order to enable the subsequent-stage pipeline processing to appropriately process the consecutive input data.

Next, referring back to FIG. 1, the heterogeneous-data generation section 107 adds the time interval information Δt to a plurality of the discrete data, which are obtained by the homogeneity/heterogeneity conversion section 106 and have the additional first derivatives, to generate the heterogeneous data. The discrete data kept in the homogeneity/heterogeneity conversion section 106 is supplied to the heterogeneous-data generation section 107 in a state of having the additional first derivatives together with the determination results (refer to FIG. 11).

The determination result is set to 1 at the time when the homogeneity/heterogeneity conversion section 106 supplies the discrete data that has been kept. Thus, the heterogeneous-data generation section 107 obtains the time interval information Δt of the kept discrete data by providing a counter that is reset every time the determination result is set to 1.

Figure 18:
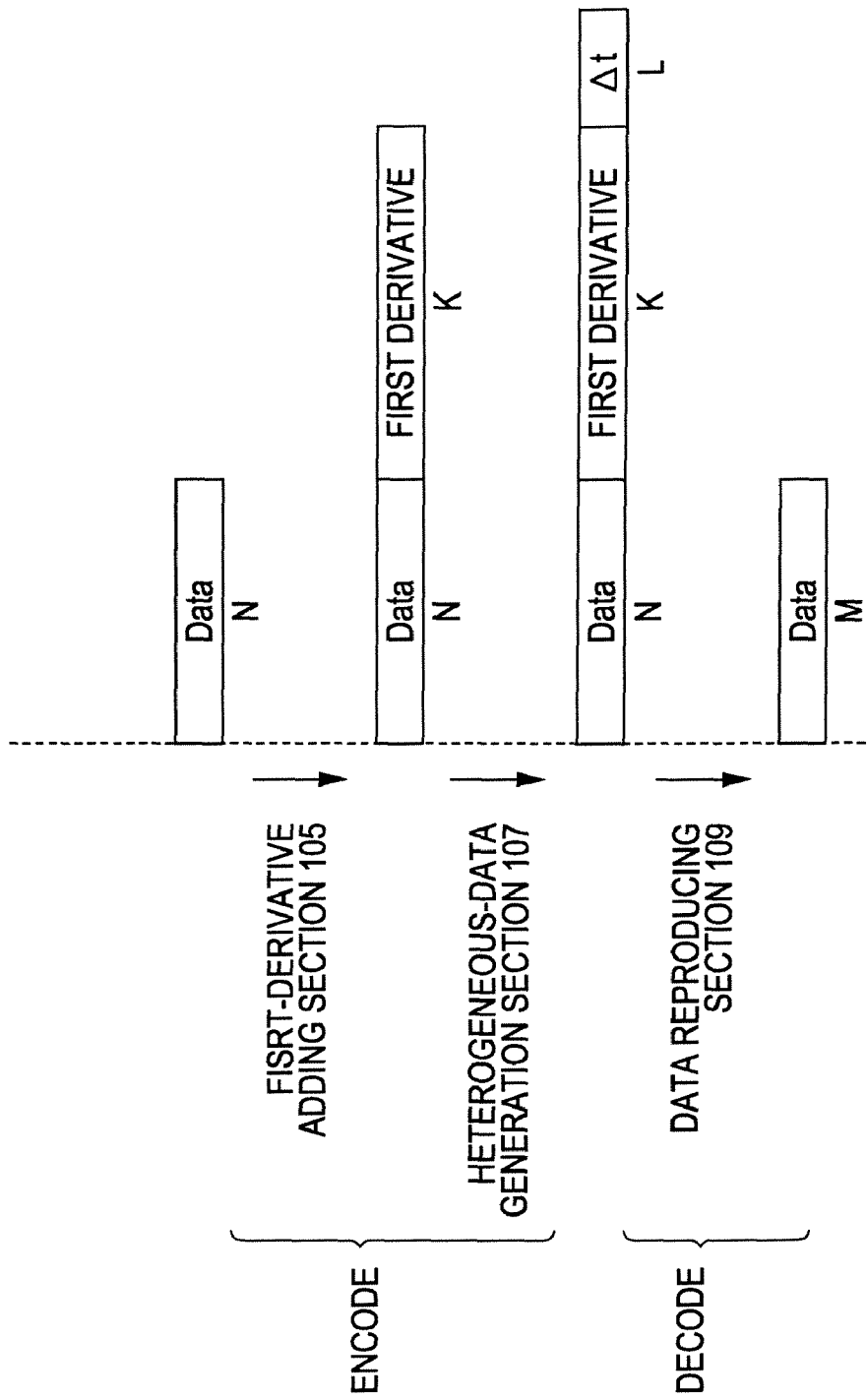
FIG. 18 is a diagram illustrating the transition of a data format in the data processing apparatus.

FIG. 18 illustrates the transition of a data format. The data input into the encoder 102 includes only N-bit discrete data (Data). The output data of the first-derivative adding section 105 is the sum of the N-bit discrete data (Data) and a K-bit first derivative. Furthermore, the output data of the heterogeneous-data generation section 107 is the sum of the N-bit discrete data (Data), a K-bit first derivative, and L-bit time interval information Δt. Also, as described below, the output data of the data reproducing section 109 of the decoder 103 includes only M-bit discrete data (Data).

The heterogeneous-data generation section 107 adds, for example, the time interval information Δt of the two discrete data to the latter discrete data. The above-described FIG. 12 illustrates an example of a plurality of discrete data (heterogeneous sample string) which are output from the homogeneity/heterogeneity conversion section 106, and have heterogeneous time intervals and additional first derivatives. For example, the time interval information Δtb of the discrete data Y(a) and Y(b) is added to the discrete data Y(b), and the time interval information Δtc of the discrete data Y(b) and Y(c) is added to the discrete data Y(c).

Next, a description will be given of the decoder 103. The decoder 103 has a curve generation section 108 and a data reproducing section 109. The curve generation section 108 generates a curve passing through the two discrete data positions for each two consecutive discrete data on the basis of the two discrete data, the first derivatives, and the time interval information using the heterogeneous data obtained by the heterogeneous-data generation section 107 of the encoder 102, that is to say, the heterogeneous discrete data with the first derivatives and the time interval information. In this regard, in FIG. 1, the heterogeneous discrete data generated by the heterogeneous-data generation section 107 of the encoder 102 is directly supplied to the curve generation section 108 of the decoder 103. However, the heterogeneous data may be stored in a storage section, such as a hard disk drive, a semiconductor memory, etc., once, and then be read at predetermined timing to be supplied to the curve generation section 108.

In the same manner as the curve generation section 11-2 (refer to FIGS. 5 and 6) of the homogeneity/heterogeneity conversion section 106 described above, the curve generation section 108 generates a cubic curve Fij(t) on the basis of Expression (6) described above assuming that the two discrete data are Y(i) and Y(j), the first derivatives added thereto are Y(i)' and Y(j), and the time interval information is $\Delta t$.

Figure 19:
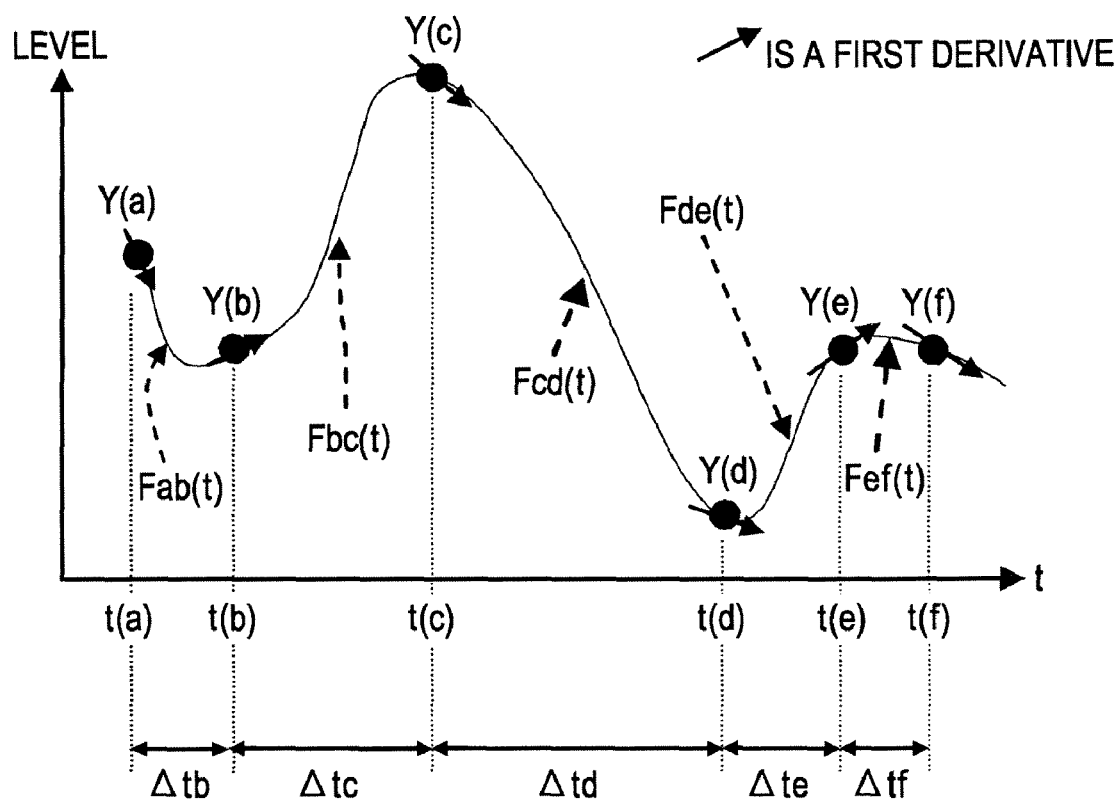
FIG. 19 is a diagram illustrating the generation processing of an interpolation curve in the interpolated-value generation section.

FIG. 19 illustrates an example of the curve (interpolation curve) generated by the curve generation section 108. First, there are the discrete data Y(a) and the first derivative Y(a)' at t=t(a), and then after the time interval of $\Delta tb$, there are the discrete data Y(b) and the first derivative Y(b)' at t=t(b). The interpolation curve Fab(t) passing through the data positions of the discrete data Y(a) and Y(b) at points t(a) and (b) in time, respectively, is generated on the basis of Expression (6) using $\Delta tb$, Y(a), Y(a)', Y(b) and Y(b)'.

Next, there are the discrete data are Y(c) and the first derivative Y(c)' at t=t(c) after the time intervals of $\Delta tc$ from Y(b) and the first derivative Y(b)' at t=t(b). The interpolation curve Fbc(t) passing through the data positions of the discrete data Y(b) and Y(c) at points t(b) and (c), respectively on the basis of Expression (6) using $\Delta tc$, Y(b), Y(b)', Y(c) and Y(c)'. In the following, Fcd(t), Fde(t), . . . are generated in the same manner.

As described above, in the homogeneity/heterogeneity conversion section 106 of the encoder 102, when one or a plurality of discrete data interposed between two discrete data Y(i) and Y(j) can be approximated by a curve Fij(t) passing through the two discrete data positions generated on the basis of the two discrete data Y(i) and Y(j), the first derivatives Y(i)' and Y(j)', and the time interval information $\Delta t$, one or a plurality of the discrete data is thinned. Thus, it becomes possible to obtain interpolated values of arbitrary points in time between the two discrete data within a range of an allowable error using each curve generated by the curve generation section 108.

The data reproducing section 109 generates a plurality of discrete data arranged at time intervals of 1/fs2 on the basis of each curve generated by the curve generation section 108. In this case, a plurality of M-bit (M is a positive integer) discrete data arranged homogeneously are generated by sampling the values of each curve at time intervals of 1/fs2. Here, fs2 is a sampling frequency, and can be set to the same frequency as or a different frequency from the sampling frequency fs1 related to a plurality of the discrete data input into the encoder 102 as described above. Also, the bit width M of each discrete data can be set to the same value as or a different value from the bit width related to the discrete data input into the encoder 102 as described above.

That is to say, the data reproducing section 109 can newly define the sampling frequency and the resolution of the homogeneous-sample string data Dout output from the decoder 103 independently of the sampling frequency and the resolution of the homogeneous-sample string data Din input into the encoder 102.

Figure 20:
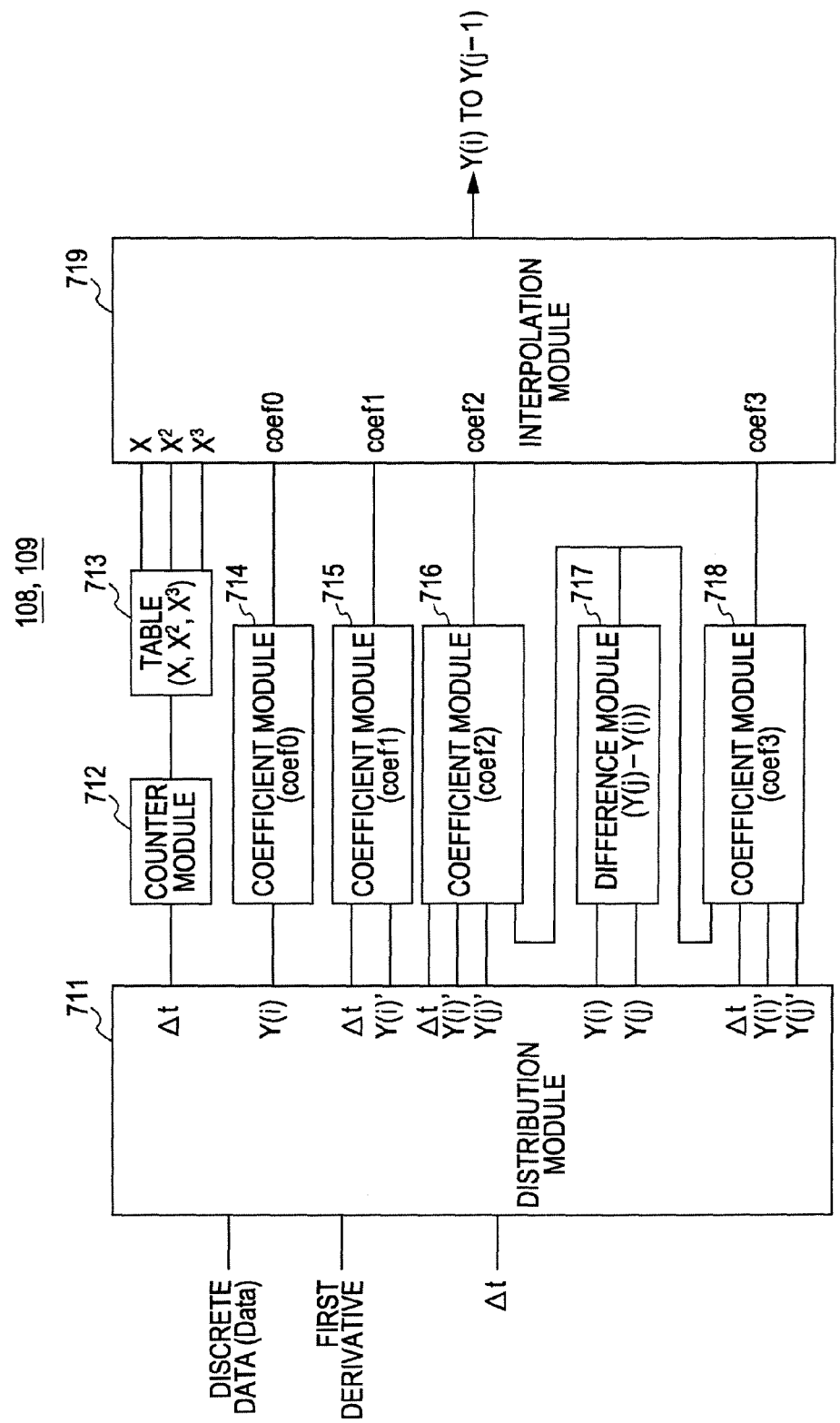
FIG. 20 is a block diagram illustrating the circuit configuration of the curve generation section and the data reproducing section.

Next, a description will be given of the curve generation section 108 and the data reproducing section 109. FIG. 20 illustrates the detailed configuration of the curve generation section 108 and the data reproducing section 109. Here, as an example, it is assumed that the bit width of the time interval information $\Delta t$ of the discrete data that was kept is 4 bits, and 15 discrete data are consecutively thinned at the maximum. Also, it is assumed that the sampling frequencies of the input and output fs1 and fs2, respectively are the same.

The curve generation section 108 and the data reproducing section 109 have a distribution module 711, a counter module 712, a table 713, coefficient modules 714 to 716 and 718, a difference module 717, and an interpolation module 719.

The distribution module 711 individually distributes and supplies two consecutive discrete data Y(i) and Y(j), the first derivatives Y(i)' and Y(j)' added thereto, and the time interval information $\Delta t$ to the counter module 712, the coefficient modules 714 to 716 and 718, and the difference module 717 on the basis of the input discrete data (Data), the first derivatives, and the time interval information $\Delta t$.

That is to say, the distribution module 711 supplies $\Delta t$ to the counter module 712, supplies Y(i) to the coefficient module 714, supplies $\Delta t$ and Y(i)' to the coefficient module 715, supplies $\Delta t$, Y(i)' and Y(j)' to the coefficient module 716, supplies Y(i) and Y(j) to the difference module 717, and supplies $\Delta t$, Y(i)' and Y(j)' to the coefficient module 718.

The counter module 712 resets the counter every time the time interval information $\Delta t$ is supplied from the distribution module 711, and then counts up the counter for each cycle. It is necessary to generate S discrete data Y(i+1) to Y(j−1) corresponding to the points t(i+1) to t(j−1) in time interposed between the two discrete data Y(i) and Y(j). As described above in the counter module 712, it becomes possible to sequentially output the values of X, $X^2$, and $X^3$ in Expression (6) described above for obtaining the discrete data Y(i), and Y(i+1) to Y(j−1) from the table 713 by counting up.

The table 703 outputs the values of X, $X^2$, and $X^3$ in Expression (6) described above on the basis of the time interval information $\Delta t$ and the count value, which are supplied from the counter module 712. As described above, the bit width of the time interval information $\Delta t$ is 4 bits, and thus the homogeneity/heterogeneity conversion section 106 continuously thins 15 discrete data at the maximum. The values of X, $X^2$, and $X^3$ individually corresponding to S+1 points t(i), t(i+1) to t(j−1) in time are output from the table 713 in response to the change of the count value for each one cycle.

In the same manner as the coefficient module 704 included in the interpolated-value generation section 700 in FIG. 16, the coefficient module 714 takes in the discrete data Y(i) supplied from the distribution module 711, and outputs the discrete data Y(i) directly as the coefficient coef0 (refer to Expression (10)). In the same manner as the coefficient module 705 included in the interpolated-value generation section 700 in FIG. 16, the coefficient module 715 takes in the time interval information $\Delta t$ and the first derivative Y(i)', which are supplied from the distribution module 711, and calculates the coefficient coef1 in Expression (6) described above by Expression (9) on the basis of those.

In the same manner as the difference module 707 included in the interpolated-value generation section 700 in FIG. 16, the difference module 717 takes in the discrete data Y(i) and Y(j), which are supplied from the distribution module 711, and calculates the difference value (Y(j)−Y(i)) on the basis of the data. The difference module 717 individually supplies the calculated difference value to the coefficient module 716 and the coefficient module 718.

In the same manner as the coefficient module 706 included in the interpolated-value generation section 700 in FIG. 16, the difference module 716 takes in the time interval information $\Delta t$ and the first derivatives Y(i)' and Y(j)' supplied from the distribution module 711, and the difference value (Y(j)–Y(i)) supplied from the difference module 717. The difference module 716 calculates the coefficient coef2 in Expression (6) described above by Expression (8) on the basis of those.

In the same manner as the coefficient module 708 included in the interpolated-value generation section 700 in FIG. 16, the difference module 718 takes in the time interval information $\Delta t$ and the first derivatives Y(i)' and Y(j)' supplied from the distribution module 711, and the difference value (Y(j)–Y(i)) supplied from the difference module 717. The difference module 718 calculates the coefficient coef3 in Expression (6) described above by Expression (7) on the basis of those.

The interpolation module 719 sequentially generates and outputs the i-th discrete data Y(i) and S discrete data Y(i+1) to Y(j−1) interposed between the i-th discrete data Y(i) and the j-th discrete data Y(j) on the basis of Expression (6) using the coefficients coef0 to coef2 calculated by the coefficient modules 714 to 716, respectively, the coefficient coef3 calculated by the coefficient module 718, and further the values of X, $X^2$, and $X^3$ output from the table 713.

A description will be given of the operation of the curve generation section 108 and the data reproducing section 109. The discrete data (Data), the first derivatives, and the time interval information $\Delta t$ are supplied to the distribution module 711. The time interval information $\Delta t$ is supplied from the distribution module 711 to the counter module 712. In the counter module 712, the counter is reset to 0 every time the time interval information $\Delta t$ is supplied, and then the counter value is incremented for each one cycle.

The counter module 712 supplies the time interval information $\Delta t$ and the count value to the table. The values of X, $X^2$, and $X^3$ individually corresponding to S+1 points t(i), t(i+1) to t(j−1) in time are sequentially output from the table 713 for each one cycle. The values of X, $X^2$, and $X^3$ are supplied to the interpolation modules 719.

The discrete data Y(i) is supplied from the distribution module 711 to the coefficient module 714, and the discrete data Y(i) is directly output from the coefficient module 714 as the coefficient coef0. Also, the time interval information $\Delta t$ and the first derivative Y(i)' are supplied from the distribution module 711 to the coefficient module 715, and the coefficient module 715 calculates the coefficient coef1 on the basis of Expression (9).

The discrete data Y(i) and Y(j) are supplied from the distribution module 711 to the difference module 717, and the difference module 717 calculates the difference value (Y(j)–Y(i)). The difference value (Y(j)–Y(i)) is individually supplied to the coefficient modules 716 and 718. Also, the time interval information $\Delta t$ and the first derivatives Y(i)' and Y(j)' are supplied from the distribution module 711 to the coefficient module 716, and the coefficient module 716 calculates the coefficient coef2 on the basis of Expression (8). Also, the time interval information $\Delta t$ and the first derivatives Y(i)' and Y(j)' are supplied from the distribution module 711 to the coefficient module 718, and the coefficient module 718 calculates the coefficient coef3 on the basis of Expression (7).

The coefficients coef0 to coef2 calculated by the coefficient modules 714 to 716, and the coefficient coef3 calculated by the coefficient module 718 are supplied to the interpolation module 719. The interpolation module 719 sequentially generates, for each one cycle, the S discrete data Y(i+1) to Y(j−1) interposed between the i-th discrete data Y(i) and the j-th discrete data Y(j) on the basis of Expression (6) using the coefficients coef0 to coef3 and the values of X, $X^2$, and $X^3$.

In this regard, in the curve generation section 108 and the data reproducing section 109, shown in FIG. 20, each processing is performed by pipeline processing so that the discrete data are output at a throughput of one output/one cycle from the interpolation module 719. Although the detailed description will be omitted, the calculation process of the pipeline processing is the same as that of the pipeline processing in the interpolated-value generation section 700 shown in FIG. 16 described above (refer to FIG. 17). The distribution module 711 holds data for a certain period of time in order to enable the subsequent-stage pipeline processing to appropriately process the consecutive input data.

Figure 21:
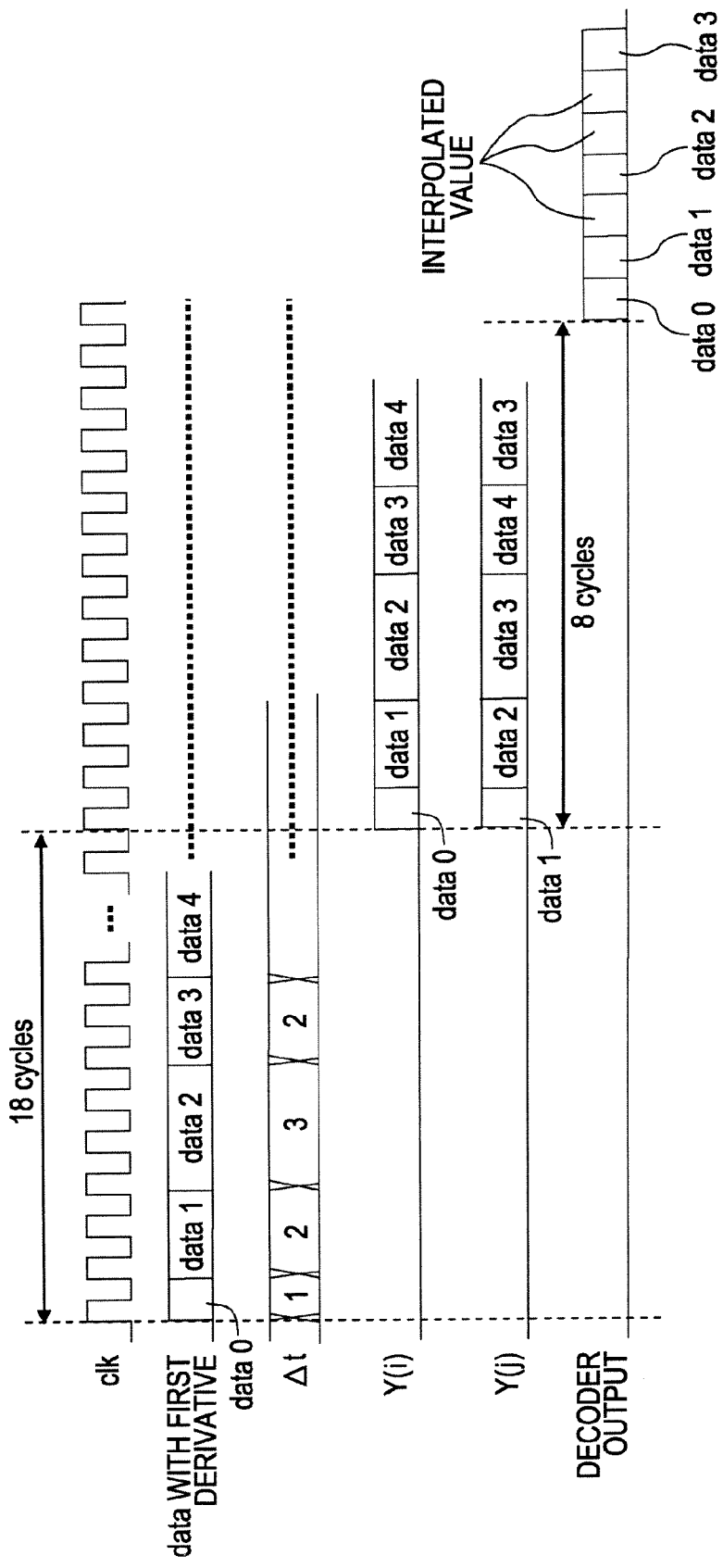
FIG. 21 is a timing chart of the input/output of the curve generation section and the data reproducing section.

FIG. 21 is a timing chart of the input/output of the curve generation section 108 and the data reproducing section 109 shown in FIG. 20. The bit width of the time interval information $\Delta t$ is 4 bits, and thus the maximum amount of thinning of the input data is 15. On the other hand, the decoder 103 can draw an interpolation curve only by receiving two discrete data Y(i) and Y(j). It is therefore necessary for the data input for the first time to be held for a certain period of time, and that period is 18 cycles shown in the timing chart. Also, the processing starts after 18 cycles, and the first interpolated value is output after 8 cycles from that time. After that, the decoder 103 can continue to output at a throughput of one output/one cycle.

As described above, it becomes possible to interpolate the thinned points in heterogeneous data by the processing structure shown in FIG. 20 to obtain homogeneous data. Also, the circuit configuration shown in FIG. 20 is an example, and the present invention is not limited to this. Also, the curve generation section 108 and the data reproducing section 109 shown in FIG. 20 have a circuit configuration common to the interpolated-value generation section 700 included in the homogeneity/heterogeneity conversion section 106 shown in FIG. 16, and thus can have a significant portion of the circuit in common with the interpolated-value generation section 700.

Next, a description will be given of the operation of the data processing apparatus 100 shown in FIG. 1. The noise suppressing section 104 of the encoder 102 receives the input of homogeneous-sample sting data Din including a plurality of N-bit discrete data arranged at time intervals of 1/fs1. The noise suppressing section 104 suppresses the fluctuations (noise components) of the lower 1-bit of a plurality of the discrete data constituting the homogeneous-sample sting data Din (refer to FIG. 2).

The homogeneous-sample sting data Din, which has been subjected to the noise-suppression processing by the noise-suppressing section 104, is supplied to the first-derivative adding section 105. The first-derivative adding section 105 adds a first derivative DT to each of a plurality of the discrete data constituting the homogeneous-sample sting data Din, which has been subjected to the noise-suppression processing by the noise-suppressing section 104 (refer to FIGS. 3 and 4). In this manner, it becomes possible for the blow-described homogeneity/heterogeneity conversion section 106 and the curve generation section 108 of the decoder 103 to generate a curve related to two discrete data by adding the first derivative DT to each of the discrete data.

A plurality of the discrete data, which have been obtained by the first-derivative adding section 105 and have homogeneous time-intervals and the additional first derivatives, are supplied to the homogeneity/heterogeneity conversion section 106. The homogeneity/heterogeneity conversion section 106 performs thinning processing to generate a plurality of the discrete data having heterogeneous time-intervals and the additional first-derivatives.

That is to say, when one or a plurality of discrete data interposed between two discrete data can be approximated by a curve which passes through the two discrete data and is generated on the basis of the discrete data, the first derivative, and the time interval information, the homogeneity/heterogeneity conversion section 106 thins one or a plurality of the discrete data, and generates a plurality of discrete data having heterogeneous time intervals and the additional first derivatives (refer to FIGS. 7 and 10).

A plurality of the discrete data, which have been obtained by the homogeneity/heterogeneity conversion section 106 and have additional first derivatives, are supplied to the heterogeneous-data generation section 107. The heterogeneous-data generation section 107 adds time interval information $\Delta t$ to a plurality of the discrete data, which have been obtained by the homogeneity/heterogeneity conversion section 106 and have the additional first derivatives, to generate the heterogeneous data (refer to FIG. 18).

The heterogeneous data generated by the heterogeneous-data generation section 107, that is to say, the heterogeneous discrete data with the first derivatives and the time interval information $\Delta t$, is supplied to the curve generation section 108 of the decoder 103 directly or through a storage section. The curve generation section 108 generates a curve which passes through the two discrete data positions for each two consecutive discrete data on the basis of the two discrete data, the first derivative, and the time interval information (refer to FIG. 19).

In the homogeneity/heterogeneity conversion section 106 of the encoder 102, when one or a plurality of discrete data interposed between two discrete data can be approximated by a curve which passes through the two discrete data positions and is generated on the basis of the two discrete data, the first derivatives, and the time interval information $\Delta t$, one or a plurality of the discrete data are thinned. Thus, it becomes possible to obtain interpolated values at arbitrary points in time between the two discrete data within a range of an allowable error using each curve generated by the curve generation section 108.

The data reproducing section 109 generates a plurality of discrete data arranged at time intervals of 1/fs2 on the basis of each curve generated by the curve generation section 108. In this case, a plurality of M-bit (M is a positive integer) discrete data arranged homogeneously are generated by sampling the values of each curve at time intervals of 1/fs2. The data reproducing section 109 can newly define the sampling frequency and the resolution of the homogeneous-sample string data Dout output from the decoder 103 independently of the sampling frequency and the resolution of the homogeneous-sample string data Din input into the encoder 102.

The data processing apparatus 100 shown in FIG. 1 individually adds a first derivative to a plurality of N-bit discrete data arranged at time intervals of 1/fs1. When one or a plurality of discrete data interposed between two discrete data can be approximated by a curve which passes through the two discrete data positions and is generated on the basis of the two discrete data, the first derivative added to the two discrete data, and the time interval information, one or a plurality of the discrete data is thinned, and a plurality of the discrete data having heterogeneous time intervals, the additional first derivative and the time interval information is generated.

After that, a curve which passes through the two discrete data is generated for each two consecutive discrete data on the basis of the discrete data, the first derivative, and the time interval information using a plurality of the discrete data, and a plurality of M-bit discrete data arranged at time intervals of 1/fs2 is obtained on the basis of each curve. Thus, it becomes possible to redefine resolution and to reproduce data to a necessary band.

Figure 22:
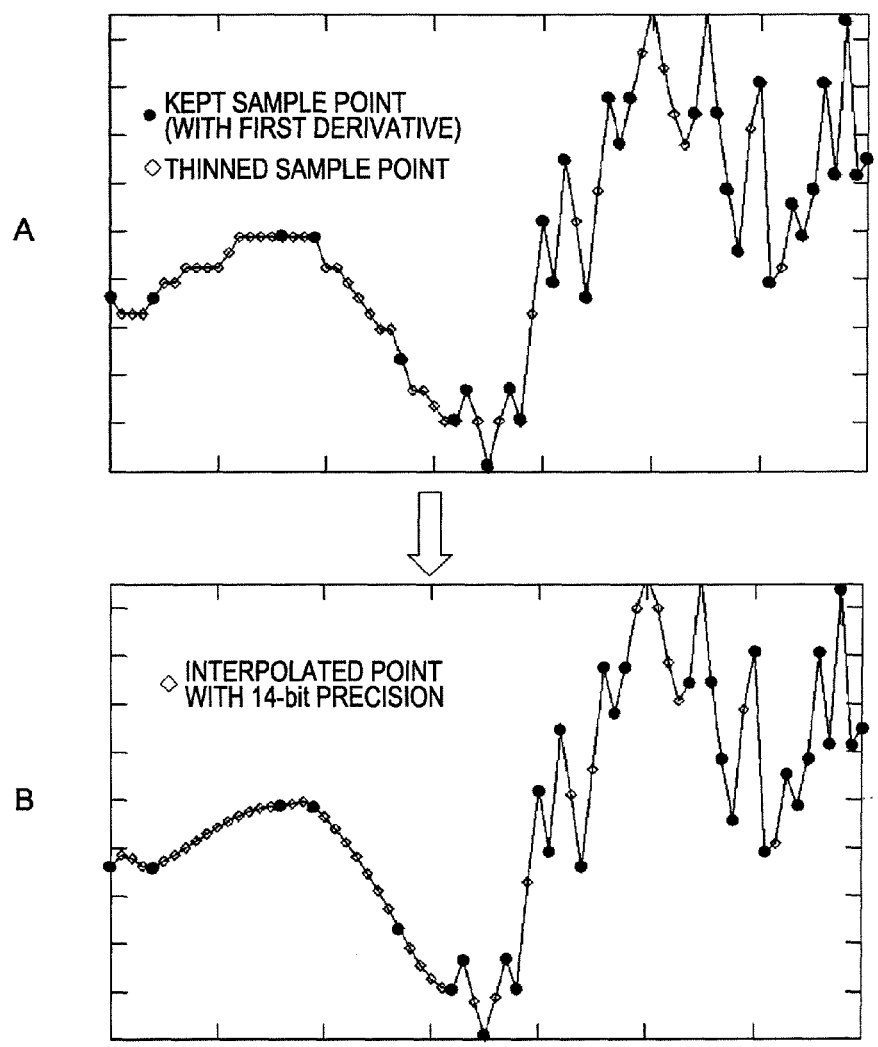
FIG. 22 is a diagram illustrating an example of the application of this invention.

FIG. 22 illustrates an example of the application of this invention. FIG. 22, A is an example of encoding 8-bit discrete data, and shows the positions of the sample points (discrete data) kept by the encoding and the positions of the thinned sample points (discrete data). FIG. 22, B is an example in which the curve generation section generates and interpolates a curve from the kept sample points (discrete data), and the result is obtained as 14-bit output. In this regard, the input and the output sampling frequencies are the same.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus comprising:

a data input section for receiving input of a plurality of N-bit (N is a positive integer) discrete data arranged at first time intervals;

a first-derivative adding section for adding a first derivative to each discrete data input in the data input section;

using a plurality of the discrete data with the additional first derivative obtained by the first-derivative adding section, when a difference between one or a plurality of discrete data interposed between two discrete data and a value on a curve passing through the two discrete data generated on the basis of the two discrete data, the first derivative added to the two discrete data, and time interval information of the two discrete data is within an allowable error, a homogeneity/heterogeneity conversion section for obtaining a plurality of discrete data having heterogeneous time intervals and the additional first derivative by thinning one or a plurality of the discrete data interposed between the two discrete data;

a heterogeneous-data generation section for generating heterogeneous data by adding time interval information to a plurality of the discrete data having the additional first derivative obtained by the homogeneity/heterogeneity conversion section;

using the heterogeneous data generated by the homogeneity/heterogeneity conversion section, a curve generation section for generating a curve passing through two positions of each two consecutive discrete data among the heterogeneous data on the basis of the two consecutive discrete data, a first derivative added to the two consecutive discrete data, and time interval information of the two consecutive discrete data; and a data reproducing section for generating and outputting a plurality of M-bit (M is a positive integer, and is the same as or different from N) discrete data arranged at second time intervals, being the same as or different from the first time intervals, on the basis of each curve generated by the curve generation section.

2. The data processing apparatus according to claim 1, wherein assuming that discrete data to which a first derivative is added is target discrete data, the first-derivative adding section generates a first derivative using a difference between the target discrete data and discrete data located before and after the target discrete data,
if a difference between the adjacent discrete data and the target discrete data is greater than a predetermined value, the first-derivative adding section uses the adjacent discrete data as discrete data located before and after the target discrete data, and if the difference is within the predetermined value, the first-derivative adding section uses the adjacent data and all the consecutive discrete data having a difference not greater than the predetermined value.

3. The data processing apparatus according to claim 1, further comprising a noise suppressing section for suppressing fluctuations of lower one bit of a plurality of the discrete data inserted into a pre-stage of the homogeneity/heterogeneity conversion section.

4. A data processing apparatus comprising:
a data input section for receiving input of a plurality of N-bit (N is a positive integer) discrete data arranged at predetermined time intervals;
a first-derivative adding section for adding a first derivative to each discrete data input in the data input section;
using a plurality of the discrete data with the additional first derivative obtained by the first-derivative adding section, when a difference between one or a plurality of discrete data interposed between two discrete data and a value on a curve passing through the two discrete data points generated on the basis of the two discrete data, the first derivative added to the two discrete data, and time interval information of the two discrete data is within an allowable error, a homogeneity/heterogeneity conversion section for obtaining a plurality of discrete data having heterogeneous time intervals and the additional first derivative by thinning one or a plurality of the discrete data interposed between the two discrete data; and
a heterogeneous-data generation section for generating heterogeneous data by adding time interval information to a plurality of the discrete data having heterogeneous time intervals and the additional first derivative obtained by the homogeneity/heterogeneity conversion section.

5. The data processing apparatus according to claim 4, further comprising a storage section for storing heterogeneous data output from the heterogeneous-data generation section.

6. A method of processing data, comprising the steps of:
data inputting for receiving input of a plurality of N-bit (N is a positive integer) discrete data arranged at first time intervals;
first-derivative adding for adding a first derivative to each discrete data input by the step of data inputting;
using a plurality of the discrete data with the additional first derivative obtained by the step of first-derivative adding, when a difference between one or a plurality of discrete data interposed between two discrete data and a value on a curve passing through the two discrete data generated on the basis of the two discrete data, the first derivative added to the two discrete data, and time interval information of the two discrete data is within an allowable error, homogeneity/heterogeneity converting for obtaining a plurality of discrete data having heterogeneous time intervals and the additional first derivative by thinning one or a plurality of the discrete data interposed between the two discrete data;
heterogeneous-data generating for generating heterogeneous data by adding time interval information to a plurality of the discrete data having the additional first derivative obtained by the step of homogeneity/heterogeneity converting.

7. A data processing apparatus comprising:
a data input section for receiving input of a plurality of N-bit (N is a positive integer) discrete data having heterogeneous time intervals, each of the discrete data having a first derivative and time interval information;
using the plurality of the discrete data input in the data input section, a curve generation section for generating a curve passing through two positions of each two consecutive discrete data among the plurality of the discrete data on the basis of the two consecutive discrete data, a first derivative added to the two consecutive discrete data, and time interval information of the two consecutive discrete data; and
a data reproducing section for generating and outputting a plurality of M-bit (M is a positive integer, and is the same as or different from N) discrete data arranged at predetermined time intervals on the basis of each curve generated by the curve generation section.

8. A method of processing data, comprising the steps of:
data inputting for receiving input of a plurality of N-bit (N is a positive integer) discrete data having heterogeneous time intervals, each of the discrete data having a first derivative and time interval information;
using the plurality of the discrete data input by the step of data inputting, curve generating for generating a curve passing through two positions of each two consecutive discrete data among the plurality of the discrete data on the basis of the two consecutive discrete data, a first derivative added to the two consecutive discrete data, and time interval information of the two consecutive discrete data; and
data reproducing for generating and outputting a plurality of M-bit (M is a positive integer, and is the same as or different from N) discrete data arranged at predetermined time intervals on the basis of each curve generated by the step of curve generating.

* * * * *